(12) United States Patent
Chen et al.

(10) Patent No.: US 9,958,645 B2
(45) Date of Patent: May 1, 2018

(54) PHOTOGRAPHING OPTICAL LENS ASSEMBLY, IMAGE CAPTURING UNIT AND ELECTRONIC DEVICE

(71) Applicant: Largan Precision Co., Ltd., Taichung (TW)

(72) Inventors: Chun-Yen Chen, Taichung (TW); Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days. days.

(21) Appl. No.: 15/166,692

(22) Filed: May 27, 2016

(65) Prior Publication Data

US 2017/0219802 A1    Aug. 3, 2017

(30) Foreign Application Priority Data

Jan. 29, 2016    (TW) .............................. 105102968 A

(51) Int. Cl.
*G02B 13/00* (2006.01)
*G02B 13/18* (2006.01)

(52) U.S. Cl.
CPC ......... *G02B 13/0045* (2013.01); *G02B 13/18* (2013.01)

(58) Field of Classification Search
CPC ........................... G02B 13/0045; G02B 13/18
USPC ................................................ 359/713, 756
See application file for complete search history.

(56) References Cited

U.S. PATENT DOCUMENTS

| | | | |
|---|---|---|---|
| 8,385,006 B2 | 2/2013 | Tsai | |
| 8,953,254 B2 | 2/2015 | Okano | |
| 9,019,626 B2 | 4/2015 | Hsieh | |
| 9,063,319 B1 | 6/2015 | Tang | |
| 2014/0320980 A1* | 10/2014 | Chen | G02B 13/0045 359/713 |
| 2015/0338607 A1 | 11/2015 | Liao et al. | |
| 2016/0062083 A1* | 3/2016 | Hsueh | G02B 13/0045 359/713 |
| 2016/0187619 A1* | 6/2016 | Tang | G02B 13/0045 359/713 |
| 2016/0356989 A1 | 12/2016 | Kubota et al. | |

* cited by examiner

*Primary Examiner* — Jordan Schwartz
*Assistant Examiner* — George G King
(74) *Attorney, Agent, or Firm* — Nixon Peabody LLP

(57) ABSTRACT

A photographing optical lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The third lens element with positive refractive power has an object-side surface being convex and an image-side surface being concave in a paraxial region thereof. The fourth lens element with negative refractive power has an object-side surface being concave and an image-side surface being convex in a paraxial region thereof. The fifth lens element has an image-side surface being concave in a paraxial region thereof. The sixth lens element has an object-side surface being convex and an image-side surface being concave in a paraxial region thereof.

49 Claims, 20 Drawing Sheets

PHOTOGRAPHING OPTICAL LENS ASSEMBLY, IMAGE CAPTURING UNIT AND ELECTRONIC DEVICE

RELATED APPLICATIONS

This non-provisional application claims priority to Taiwan Application No. 105102968, filed Jan. 29, 2016, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

Miniaturized optical systems have been widely applied to different kinds of electronic devices, such as smartphones, wearable devices, tablet personal computers, dashboard cameras, aerial photographic cameras and image recognition systems, for various requirements. However, a conventional compact optical system is unable to satisfy the requirements of wide field of view and high image resolution simultaneously. Thus, there is a need to develop an optical system featuring a wide view angle with high image resolution.

SUMMARY

According to one aspect of the present disclosure, a photographing optical lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The third lens element with positive refractive power has an object-side surface being convex in a paraxial region thereof and an image-side surface being concave in a paraxial region thereof. The fourth lens element with negative refractive power has an object-side surface being concave in a paraxial region thereof and an image-side surface being convex in a paraxial region thereof. The fifth lens element has an image-side surface being concave in a paraxial region thereof. The sixth lens element has an object-side surface being convex in a paraxial region thereof and an image-side surface being concave in a paraxial region thereof, wherein the image-side surface of the sixth lens element has at least one convex shape in an off-axis region thereof, and the object-side surface and the image-side surface of the sixth lens element are both aspheric. The photographing optical lens assembly has a total of six lens elements. There is an air gap in a paraxial region located between every two lens elements of the photographing optical lens assembly that are adjacent to each other. When a curvature radius of the image-side surface of the third lens element is R6, a curvature radius of the object-side surface of the fourth lens element is R7, a curvature radius of the image-side surface of the fifth lens element is R10, a curvature radius of the object-side surface of the sixth lens element is R11, the following conditions are satisfied:

$$-7.0 < R6/R7 < 0; \text{ and}$$

$$0 < R10/R11 < 2.0.$$

According to another aspect of the present disclosure, an image capturing unit includes the aforementioned photographing optical lens assembly and an image sensor, wherein the image sensor is disposed on an image surface of the photographing optical lens assembly.

According to still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
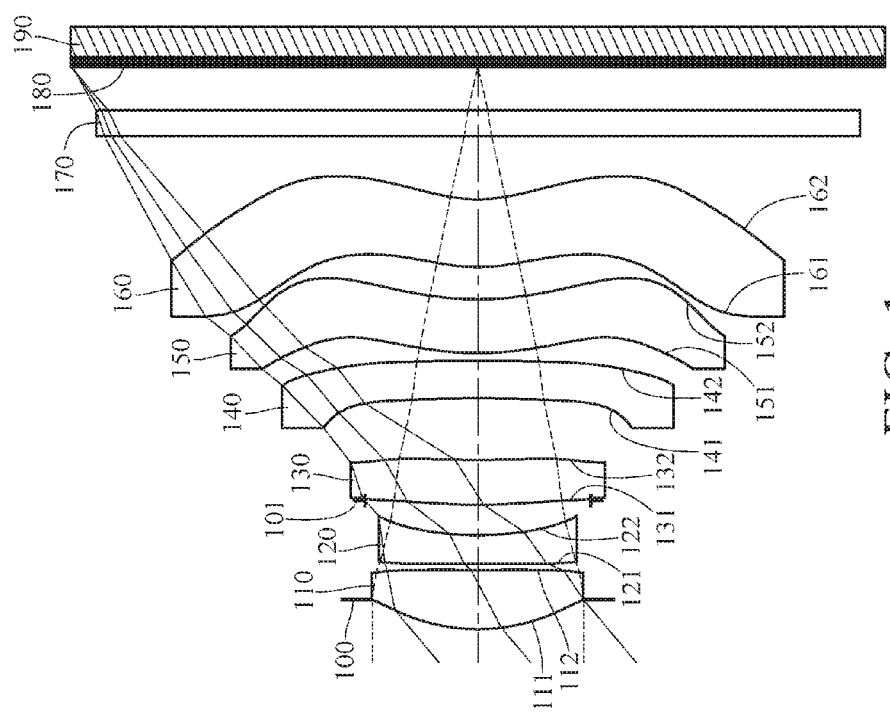
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element and a sixth lens element. The photographing optical lens assembly has a total of six lens elements.

There is an air gap in a paraxial region between every two lens elements of the photographing optical lens assembly that are adjacent to each other; that is, each of the first through the sixth lens elements can be a single and non-cemented lens element. Moreover, the manufacturing process of cemented lenses is more complex than non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there can be an air gap in a paraxial region between every two lens elements of the photographing optical lens assembly that are adjacent to each other in the present disclosure for avoiding the problems generated by the cemented lens elements.

The first lens element with positive refractive power has an object-side surface being convex in a paraxial region thereof. Therefore, it is favorable for providing the photographing optical lens assembly with sufficient positive refractive power so as to reduce a total track length thereof.

The second lens element can have negative refractive power. Furthermore, the second lens element can have an object-side surface being convex in a paraxial region thereof and an image-side surface being concave in a paraxial region. Therefore, it is favorable for correcting aberrations generated by the first lens element.

The third lens element with positive refractive power has an object-side surface being convex in a paraxial region thereof and an image-side surface being concave in a paraxial region. Therefore, it is favorable for correcting aberrations at the off-axis region. Furthermore, the image-side surface of the third lens element can have a shape changing from concave to convex and a shape changing from convex to concave in an off-axis region thereof. In detail, the image-side surface of the third lens element can change, in order from a concave shape to a convex shape then to another concave shape, to form a wave-like shape. Therefore, it is favorable for reducing the incident angle at the peripheral region of the image and correcting comatic aberration.

The fourth lens element with negative refractive power has an object-side surface being concave in a paraxial region thereof and an image-side surface being convex in a paraxial region thereof. Therefore, the configuration of the third and fourth lens elements is favorable for further correcting aberrations.

The fifth lens element has an object-side surface being concave in a paraxial region thereof. Furthermore, the fifth lens element can have positive refractive power. Therefore, it is favorable for correcting astigmatism and reducing the incident angle of the light projecting onto the image sensor so as to improve the image-sensing efficiency of the image sensor and correct aberrations at the off-axial region.

The sixth lens element has an object-side surface being convex in a paraxial region thereof and an image-side surface being concave in a paraxial region thereof, wherein the image-side surface of the sixth lens element has at least one convex shape in an off-axis region thereof. Furthermore, the sixth lens element can have negative refractive power. Therefore, it is favorable for moving the principal point of the photographing optical lens assembly towards the object side so as to reduce the total track length, thereby maintaining a compact size thereof.

When a curvature radius of the image-side surface of the third lens element is R6, a curvature radius of the object-side surface of the fourth lens element is R7, the following condition is satisfied: $-7.0<R6/R7<0$. Therefore, it is favorable for balancing the aberration correction capabilities between the third lens element and the fourth lens element so as to properly correct aberrations at the off-axis region. In addition, it is also favorable for properly arranging the shapes of the third lens element and the fourth lens element so as to prevent ghosting.

When a curvature radius of an image-side surface of the fifth lens element is R10, a curvature radius of the object-side surface of the sixth lens element is R11, the following condition is satisfied: $0<R10/R11<2.0$. Therefore, it is favorable for arranging the fifth lens element and the sixth lens element so as to obtain a proper axial distance between the fifth lens element and the sixth lens element for assembling the lens elements as well as arranging the shapes of the lens elements. In addition, the sixth lens element with convex object-side surface and concave image-side surface is favorable for reducing a back focal length as well as correcting high-order aberrations. Preferably, the following condition can also be satisfied: $0.35<R10/R11<1.85$. More preferably, the following condition can also be satisfied: $0.50<R10/R11<1.50$.

When a central thickness of the third lens element is CT3, a central thickness of the fourth lens element is CT4, the following condition can be satisfied: $CT4/CT3<1.15$. Therefore, the thicknesses of the third lens element and the fourth lens element are proper for assembling and arranging the lens elements of the photographing optical lens assembly.

When a focal length of the third lens element is f3, a focal length of the fourth lens element is f4, the following condition can be satisfied: $-1.0<f3/f4<0$. Therefore, it is favorable for reducing the sensitivity of the photographing optical lens assembly so as to improve the image quality.

When a focal length of the photographing optical lens assembly is f, the curvature radius of the image-side surface of the third lens element is R6, the following condition can be satisfied: $0<R6/f<2.5$. Therefore, it is favorable for arranging the shape of the third lens element so as to effectively correct the Petzval sum, thereby improving the flatness of the image surface.

When the focal length of the photographing optical lens assembly is f, the focal length of the third lens element is f3, the focal length of the fourth lens element is f4, a focal length of the fifth lens element is f5, a focal length of the sixth lens element is f6, the following condition can be satisfied: $|f/f3|+|f/f4|+|f/f5|+|f/f6|<1.0$. Therefore, it is favorable for balancing the refractive power distribution of the photographing optical lens assembly so as to prevent the refractive power of a single lens element from overly strong, thereby properly correcting aberrations at the off-axis region. In addition, it is favorable for manufacturing the lens elements with a wide tolerance.

When the central thickness of the third lens element is CT3, an axial distance between the second lens element and the third lens element is T23, an axial distance between the third lens element and the fourth lens element is T34, the following condition can be satisfied: CT3/(T23+T34)<0.75. Therefore, it is favorable for providing sufficient space at opposite two sides of the third lens element so that the third lens element and the lens elements adjacent to the third lens element are prevented from interfering with each other in the assembling process.

Figure 17:
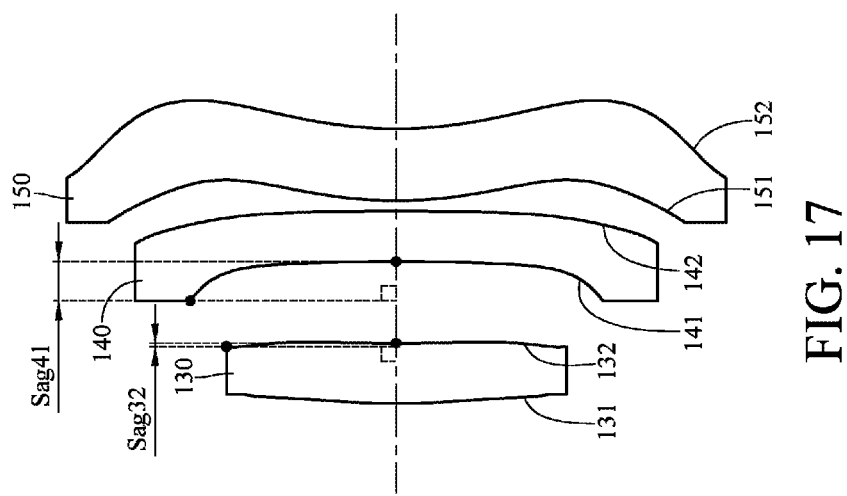
FIG. 17 shows a schematic view of the parameters Sag32 and Sag41 according to the 1st embodiment of the present disclosure.

When the central thickness of the fourth lens element is CT4, a distance in parallel with an optical axis from an axial point of the object-side surface of the fourth lens element on the optical axis to a position of a maximum effective radius of the object-side surface of the fourth lens element is Sag41, the following condition can be satisfied: |Sag41|/CT4<1.10. Therefore, it is favorable for strengthening the configuration of the fourth lens element so as to prevent the fourth lens element from cracking in the assembling process due to overly large curvature. As seen in FIG. 17, FIG. 17 shows a schematic view of the parameter Sag41 according to the 1st embodiment of the present disclosure. The distance toward the image side is defined as positive, and the distance toward the object side is defined as negative.

When a focal length of the first lens element is f1, a focal length of the second lens element is f2, the focal length of the third lens element is f3, the focal length of the fourth lens element is f4, the focal length of the fifth lens element is f5, the focal length of the sixth lens element is f6, that is, the focal length of the i-th lens element is fi, the following condition can be satisfied: $\Sigma(f1/|fi|)<1.75$, wherein i=2, 3, 4, 5, 6 (which means that the condition (f1/|f2|)+(f1/|f3|)+(f1/|f4|)+(f1/|f5|)+(f1/|f6|)<1.75 is satisfied). Therefore, it is favorable for balancing the refractive power of the lens elements so as to prevent the correction of the aberrations from becoming too large.

When a sum of axial distances between every two lens elements of the photographing optical lens assembly adjacent to each other is ΣAT, a sum of central thicknesses of the lens elements of the photographing optical lens assembly is ΣCT, a maximum image height of the photographing optical lens assembly (half of a diagonal length of an effective photosensitive area of an image sensor) is ImgH, the following condition can be satisfied: 0.75<(ΣCT/ImgH)+(ΣAT/ImgH)<1.33. Therefore, it is favorable for reducing the total track length so as to keep the photographing optical lens assembly compact. In detail, ΣAT equals to the sum of an axial distance between the first lens element and the second lens element (T12), the axial distance between the second lens element and the third lens element (T23), the axial distance between the third lens element and the fourth lens element (T34), an axial distance between the fourth lens element and the fifth lens element (T45) and the axial distance between the fifth lens element and the sixth lens element (T56). In addition, ΣCT equals to the sum of a central thickness of the first lens element (CT1), a central thickness of the second lens element (CT2), the central thickness of the third lens element (CT3), the central thickness of the fourth lens element (CT4), a central thickness of the fifth lens element (CT5) and a central thickness of the sixth lens element (CT6).

When the axial distance between the second lens element and the third lens element is T23, the axial distance between the third lens element and the fourth lens element is T34, the following condition can be satisfied: T23/T34<1.5. Therefore, the position of the third lens element is proper for maintaining the compact size of the photographing optical lens assembly.

When the thickness of the fifth lens element is CT5, the thickness of the sixth lens element is CT6, the following condition can be satisfied: CT5/CT6<0.95. Therefore, it is favorable for reducing the back focal length of the photographing optical lens assembly.

When the focal length of the photographing optical lens assembly is f, the curvature radius of the image-side surface of the fifth lens element is R10, the following condition can be satisfied: 0<R10/f<1.0. Therefore, it is favorable for effectively correcting spherical aberration.

When the focal length of the photographing optical lens assembly is f, a curvature radius of the object-side surface of the fifth lens element is R9, the curvature radius of the image-side surface of the fifth lens element is R10, the following condition can be satisfied: |R9/f|+|R10/f|<1.85. Therefore, it is favorable for correcting distortion of the off-axial field.

According to the disclosure, the central thickness of the sixth lens element can be the largest among all central thicknesses of the lens elements of the photographing optical lens assembly. That is, the sixth lens element has larger central thickness than the first lens element, the second lens element, the third lens element, the fourth lens element and the fifth lens element. Therefore, a structural strength of the sixth lens element is favorable for an easier molding process. Moreover, it is favorable for preventing the surfaces of the sixth lens element from overly curved so as to increase the manufacturing and assembling yield rates.

When a curvature radius of the object-side surface of the first lens element is R1, a curvature radius of an image-side surface of the first lens element is R2, a curvature radius of the object-side surface of the second lens element is R3, a curvature radius of the image-side surface of the second lens element is R4, a curvature radius of the object-side surface of the third lens element is R5, the curvature radius of the image-side surface of the third lens element is R6, the curvature radius of the object-side surface of the fourth lens element is R7, a curvature radius of the image-side surface of the fourth lens element is R8, a curvature radius of the object-side surface of the fifth lens element is R9, the curvature radius of the image-side surface of the fifth lens element is R10, the curvature radius of the object-side surface of the sixth lens element is R11, a curvature radius of the image-side surface of the sixth lens element is R12, the following condition can be satisfied: |R12|<|Ri|, wherein i=1, 2, 3, 4, 5, 6, 7, 8, 9, 10, 11 (which means that the conditions |R12|<|R1|, |R12|<|R2|, |R12|<|R3|, |R12|<|R4|, |R12|<R5|, |R12|<|R6|, |R12|<|R7|, |R12|<|R8|, |R12|<|R9|, |R12|<|R10| and |R12|<|R11| are satisfied). Therefore, it is favorable for moving the principal point towards the object side of the photographing optical lens assembly so as to reduce the back focal length. In addition, it is also favorable for effectively reducing the total track length of the photographing optical lens assembly equipped with an image sensor having a large chief ray angle.

When the central thickness of the third lens element is CT3, a distance in parallel with the optical axis from an axial point of the image-side surface of the third lens element on the optical axis to a position of a maximum effective radius of the image-side surface of the third lens element is Sag32, the following condition can be satisfied: |Sag32|/CT3<0.15. Therefore, it is favorable for properly arranging the curvature of the image-side surface of the third lens element so that reflection generated by the incident light is prevented at the off-axis region. As seen in FIG. 17, FIG. 17 shows a schematic view of the parameter Sag32 according to the 1st embodiment of the present disclosure. The distance toward the image-side is defined as positive, and the distance toward the object-side is defined as negative.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing optical lens assembly can be made of glass or plastic material. When the lens elements are made of glass material, the refractive power distribution of the photographing optical lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the photographing optical lens assembly can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens assembly on the corresponding image sensor can be flat or curved, particularly a concave curved surface facing towards the object side of the photographing optical lens assembly.

According to the present disclosure, the photographing optical lens assembly can include at least one stop, such as an aperture stop, a glare stop or a field stop. Said glare stop or said field stop is allocated for eliminating the stray light and thereby improving the image quality thereof.

According to the present disclosure, an image capturing unit includes the aforementioned photographing optical lens assembly and an image sensor, wherein the image sensor is disposed on the image side and can be located on or near an image surface of the aforementioned photographing optical lens assembly. In some embodiments, the image capturing unit can further include a barrel member, a holder member or a combination thereof.

Figure 18:
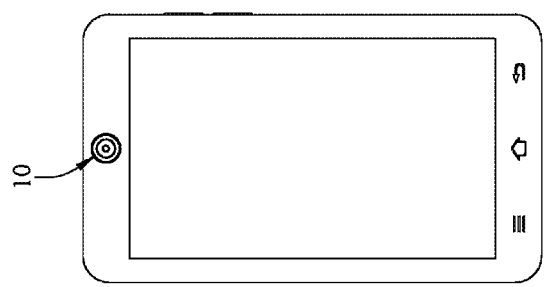
FIG. 18 shows an electronic device according to one embodiment.
Figure 19:
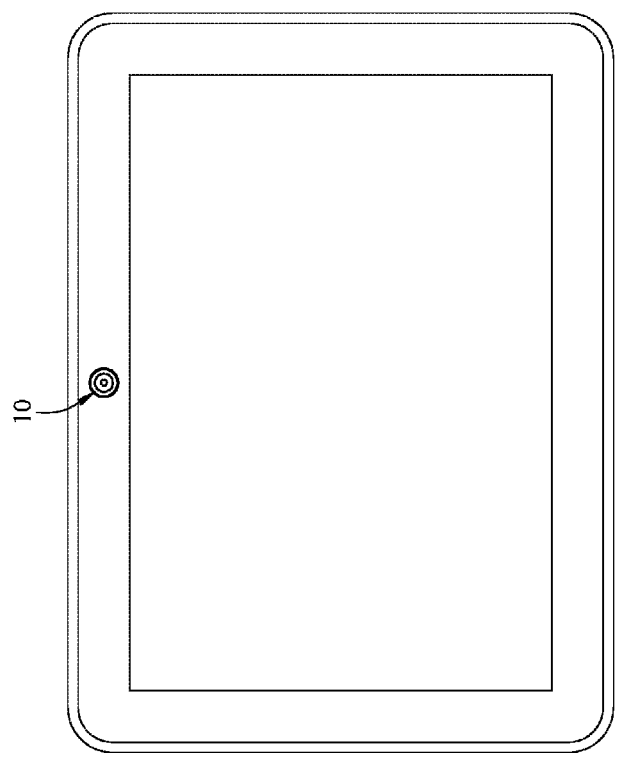
FIG. 19 shows an electronic device according to another embodiment.
Figure 20:
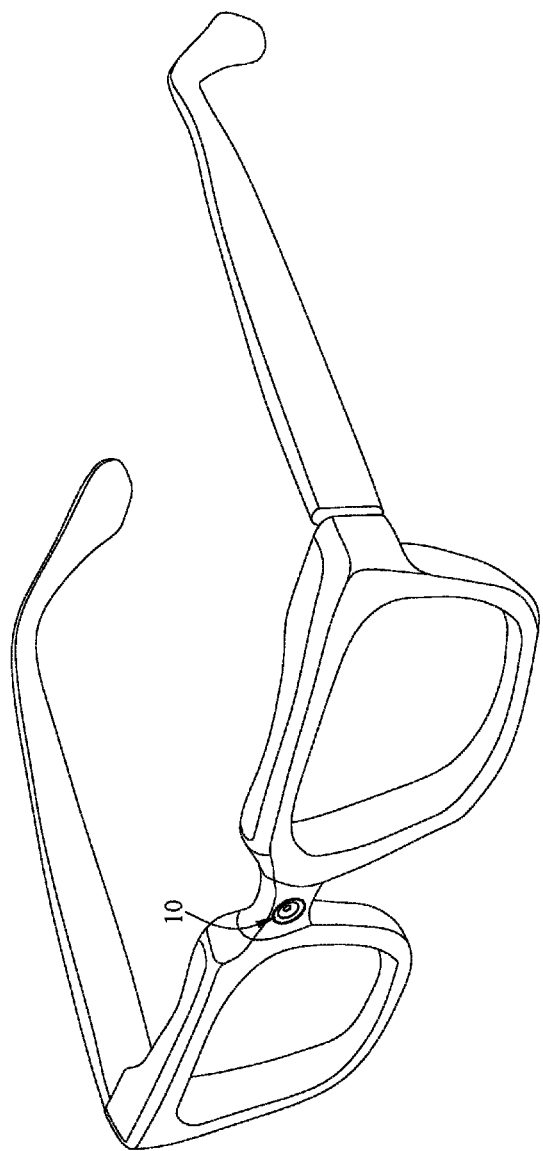
FIG. 20 shows an electronic device according to still another embodiment.

In FIG. 18, FIG. 19 and FIG. 20, an image capturing unit 10 may be installed in, but not limited to, an electronic device, including a smartphone (FIG. 18), a tablet personal computer (FIG. 19) or a wearable device (FIG. 20). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens assembly can be optionally applied to optical systems with a movable focus. Furthermore, the photographing optical lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
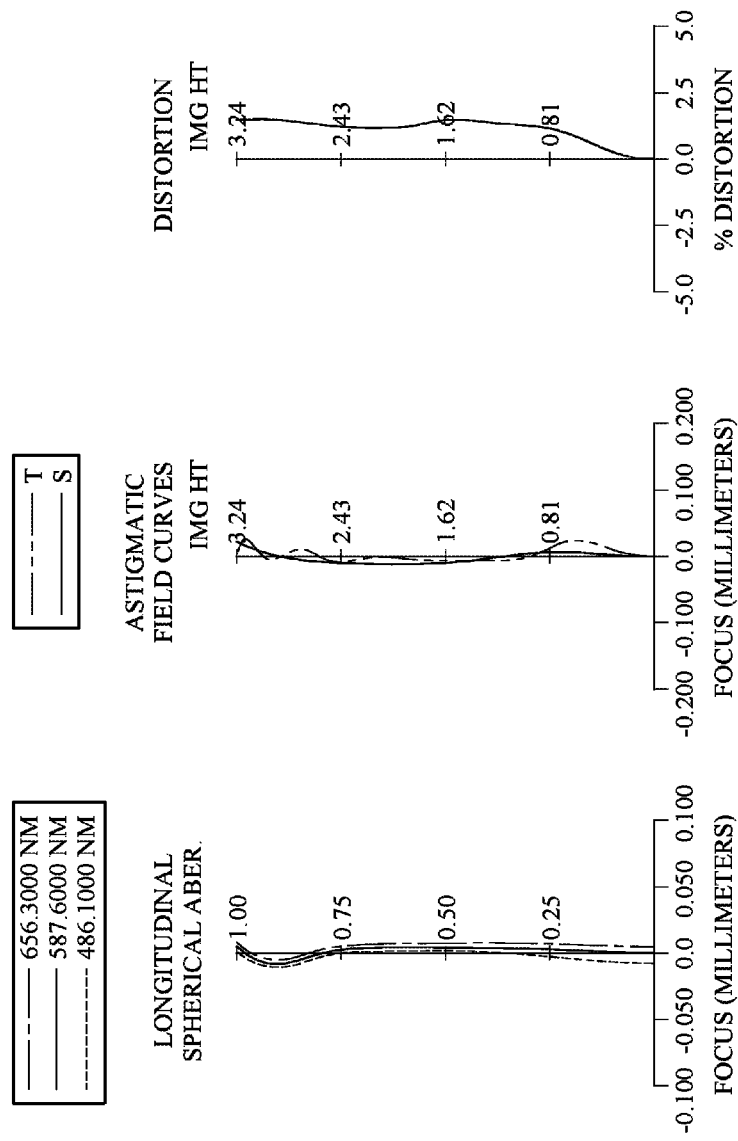
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, an aperture stop 100, a first lens element 110, a second lens element 120, a stop 101, a third lens element 130, a fourth lens element 140, a fifth lens element 150, a sixth lens element 160, an IR-cut filter 170 and an image surface 180, wherein the photographing optical lens assembly has a total of six lens elements (110-160). There is an air gap in a paraxial region between every two lens elements (110-160) of the photographing optical lens assembly that are adjacent to each other. The stop 101, for example, is a glare stop or a field stop.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has a shape changing from concave to convex and a shape changing from convex to concave in an off-axis region thereof.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axis region thereof.

In this embodiment, a central thickness of the sixth lens element 160 is the largest among all central thicknesses of the lens elements (110-160) of the photographing optical lens assembly. That is, the sixth lens element 160 has larger central thickness than the first lens element 110, the second lens element 120, the third lens element 130, the fourth lens element 140 and the fifth lens element 150.

The IR-cut filter 170 is made of glass material and located between the sixth lens element 160 and the image surface 180, and will not affect the focal length of the photographing optical lens assembly. The image sensor 190 is disposed on or near the image surface 180 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i} (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.79 millimeters (mm); Fno=2.25; and HFOV=40.1 degrees (deg.).

When a curvature radius of the image-side surface 132 of the third lens element 130 is R6, a curvature radius of the object-side surface 141 of the fourth lens element 140 is R7, the following condition is satisfied: R6/R7=−0.83.

When a curvature radius of the image-side surface 152 of the fifth lens element 150 is R10, a curvature radius of the object-side surface 161 of the sixth lens element 160 is R11, the following condition is satisfied: R10/R11=1.66.

When a central thickness of the third lens element 130 is CT3, a central thickness of the fourth lens element 140 is CT4, the following condition is satisfied: CT4/CT3=0.83.

When a focal length of the third lens element 130 is f3, a focal length of the fourth lens element 140 is f4, the following condition is satisfied: f3/f4=−0.34.

When the focal length of the photographing optical lens assembly is f, the curvature radius of the image-side surface 132 of the third lens element 130 is R6, the following condition is satisfied: R6/f=3.04.

When the focal length of the photographing optical lens assembly is f, the focal length of the third lens element 130 is f3, the focal length of the fourth lens element 140 is f4, a focal length of the fifth lens element 150 is f5, a focal length of the sixth lens element 160 is f6, the following condition is satisfied: |f/f3|+|f/f4|+|f/f5|+|f/f6|=0.54.

When the central thickness of the third lens element 130 is CT3, an axial distance between the second lens element 120 and the third lens element 130 is T23, an axial distance between the third lens element 130 and the fourth lens element 140 is T34, the following condition is satisfied: CT3/(T23+T34)=0.49.

When the central thickness of the fourth lens element 140 is CT4, a distance in parallel with an optical axis from an axial point of the object-side surface 141 of the fourth lens element 140 on the optical axis to a position of a maximum effective radius of the object-side surface 141 of the fourth lens element 140 is Sag41, the following condition is satisfied: |Sag41|/CT4=0.78.

When a focal length of the first lens element 110 is f1, a focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, a focal length of the i-th lens element is fi, the following condition is satisfied: Σ(f1/|fi|)=1.03, wherein i=2, 3, 4, 5, 6.

When a sum of axial distances between every two lens elements (110-160) of the photographing optical lens assembly adjacent to each other is ΣAT, a sum of central thicknesses of the lens elements (110-160) of the photographing optical lens assembly is ΣCT, a maximum image height of the photographing optical lens assembly is ImgH, the following condition is satisfied: (ΣCT/ImgH)+(ΣAT/ImgH)=1.06.

When the axial distance between the second lens element 120 and the third lens element 130 is T23, the axial distance between the third lens element 130 and the fourth lens element 140 is T34, the following condition is satisfied: T23/T34=0.49.

When a thickness of the fifth lens element 150 is CT5, a thickness of the sixth lens element 160 is CT6, the following condition is satisfied: CT5/CT6=0.79.

When the focal length of the photographing optical lens assembly is f, the curvature radius of the image-side surface 152 of the fifth lens element 150 is R10, the following condition is satisfied: R10/f=0.60.

When the focal length of the photographing optical lens assembly is f, a curvature radius of the object-side surface 151 of the fifth lens element 150 is R9, the curvature radius of the image-side surface 152 of the fifth lens element 150 is R10, the following condition is satisfied: |R9/f|+|R10/f|=1.30.

When the central thickness of the third lens element 130 is CT3, a distance in parallel with the optical axis from an axial point of the image-side surface 132 of the third lens element 130 on the optical axis to a position of a maximum effective radius of the image-side surface 132 of the third lens element 130 is Sag32, the following condition is satisfied: |Sag32|/CT3=0.06.

The detailed optical data of the 1st embodiment are shown in Table 1 and the aspheric surface data are shown in Table 2 below.

tables presented below for each embodiment are the corresponding schematic parameter and aberration curves, and the definitions of the terms in the tables are the same as Table 1 and Table 2 of the 1st embodiment. Therefore, an explanation in this regard will not be provided again.

TABLE 1

1st Embodiment
f = 3.79 mm, Fno = 2.25, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.235 | | | | |
| 2 | Lens 1 | 1.485 | (ASP) | 0.472 | Plastic | 1.544 | 56.0 | 2.94 |
| 3 | | 18.408 | (ASP) | 0.050 | | | | |
| 4 | Lens 2 | 14.539 | (ASP) | 0.230 | Plastic | 1.614 | 25.6 | −4.76 |
| 5 | | 2.419 | (ASP) | 0.276 | | | | |
| 6 | Stop | Plano | | −0.035 | | | | |
| 7 | Lens 3 | 4.168 | (ASP) | 0.360 | Plastic | 1.544 | 56.0 | 11.80 |
| 8 | | 11.507 | (ASP) | 0.490 | | | | |
| 9 | Lens 4 | −13.826 | (ASP) | 0.300 | Plastic | 1.583 | 30.2 | −34.76 |
| 10 | | −43.791 | (ASP) | 0.063 | | | | |
| 11 | Lens 5 | 2.638 | (ASP) | 0.429 | Plastic | 1.544 | 56.0 | −52.78 |
| 12 | | 2.277 | (ASP) | 0.258 | | | | |
| 13 | Lens 6 | 1.371 | (ASP) | 0.541 | Plastic | 1.560 | 45.0 | 108.17 |
| 14 | | 1.204 | (ASP) | 0.500 | | | | |
| 15 | IR-cut filter | Plano | | 0.210 | Glass | 1.517 | 64.2 | — |
| 16 | | Plano | | 0.346 | | | | |
| 17 | Image | Plano | | — | | | | |

Note:
Reference wavelength is 587.6 nm (d-line).
Effective radius of the stop (Surface 6) is 0.900 mm.
Effective radius of the object-side surface of the fifth lens element (Surface 11) is 1.720 mm.

TABLE 2

Aspheric Coefficients

| | Surface # | | | | | |
|---|---|---|---|---|---|---|
| | 2 | 3 | 4 | 5 | 7 | 8 |
| k = | −5.3695E−01 | 9.0000E+01 | 9.0000E+01 | 9.9530E−01 | −8.8464E+01 | −6.2533E+01 |
| A4 = | 7.6282E−03 | −2.2807E−01 | −2.9749E−01 | −1.4778E−01 | 3.3310E−02 | −7.1180E−02 |
| A6 = | −8.9622E−03 | 7.0956E−01 | 1.2344E+00 | 6.8924E−01 | −3.4050E−01 | 4.3696E−02 |
| A8 = | 5.6135E−02 | −1.3437E+00 | −2.5331E+00 | −1.2979E+00 | 9.6768E−01 | −3.0378E−01 |
| A10 = | −2.8923E−01 | 1.3738E+00 | 3.2861E+00 | 1.6045E+00 | −1.7668E+00 | 7.0739E−01 |
| A12 = | 3.8355E−01 | −9.1497E−01 | −2.5430E+00 | −9.4434E−01 | 1.7520E+00 | −8.9737E−01 |
| A14 = | −2.6006E−01 | 2.7222E−01 | 8.9437E−01 | 1.7056E−01 | −6.3185E−01 | 5.9159E−01 |

| | Surface # | | | | | |
|---|---|---|---|---|---|---|
| | 9 | 10 | 11 | 12 | 13 | 14 |
| k = | 6.1779E+00 | −6.9501E+00 | −1.9990E−01 | −2.8852E+01 | −4.5174E+00 | −1.4410E+00 |
| A4 = | −5.5811E−02 | −8.6090E−02 | −6.8754E−01 | 1.0027E−01 | −3.5462E−01 | −3.7424E−01 |
| A6 = | 2.9374E−01 | 2.3757E−01 | −8.6616E−02 | −7.6371E−02 | 3.1669E−01 | 2.6097E−01 |
| A8 = | −5.9229E−01 | −3.6011E−01 | 3.4879E−02 | −1.7364E−02 | −1.9589E−01 | −1.2747E−01 |
| A10 = | 5.3693E−01 | 2.6646E−01 | −3.0795E−02 | 3.2676E−02 | 6.9339E−02 | 3.7556E−02 |
| A12 = | −2.5762E−01 | −1.0325E−01 | 2.4379E−02 | −1.4691E−02 | −1.3387E−02 | −6.3029E−03 |
| A14 = | 4.7933E−02 | 2.0344E−02 | −7.8685E−03 | 2.9470E−03 | 1.3279E−03 | 5.5506E−04 |
| A16 = | — | −1.6519E−03 | 8.7347E−04 | −2.2058E−04 | −5.3261E−05 | −1.9884E−05 |

Figure 3:
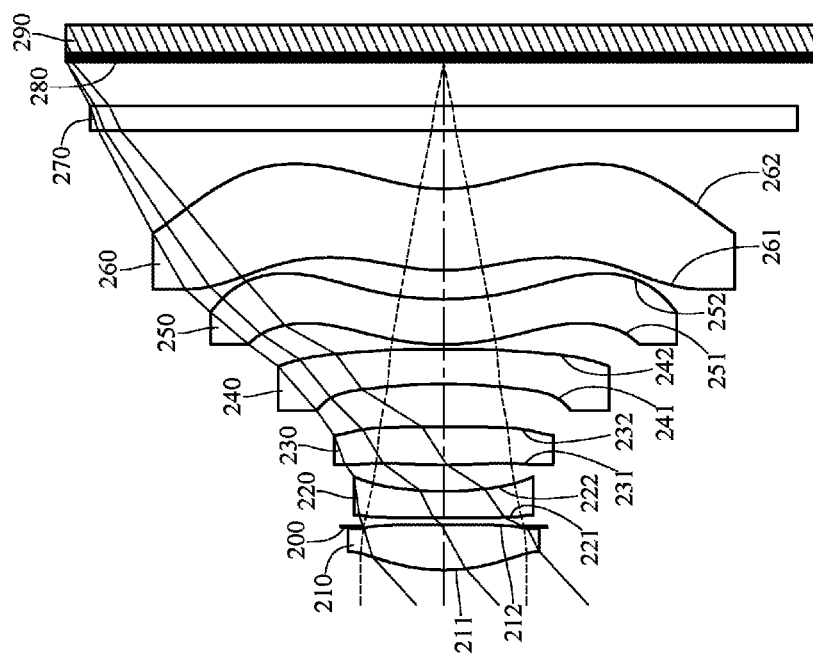
FIG. 3 is a schematic view of an image capturing unit according to the 2nd embodiment of the present disclosure.
Figure 4:
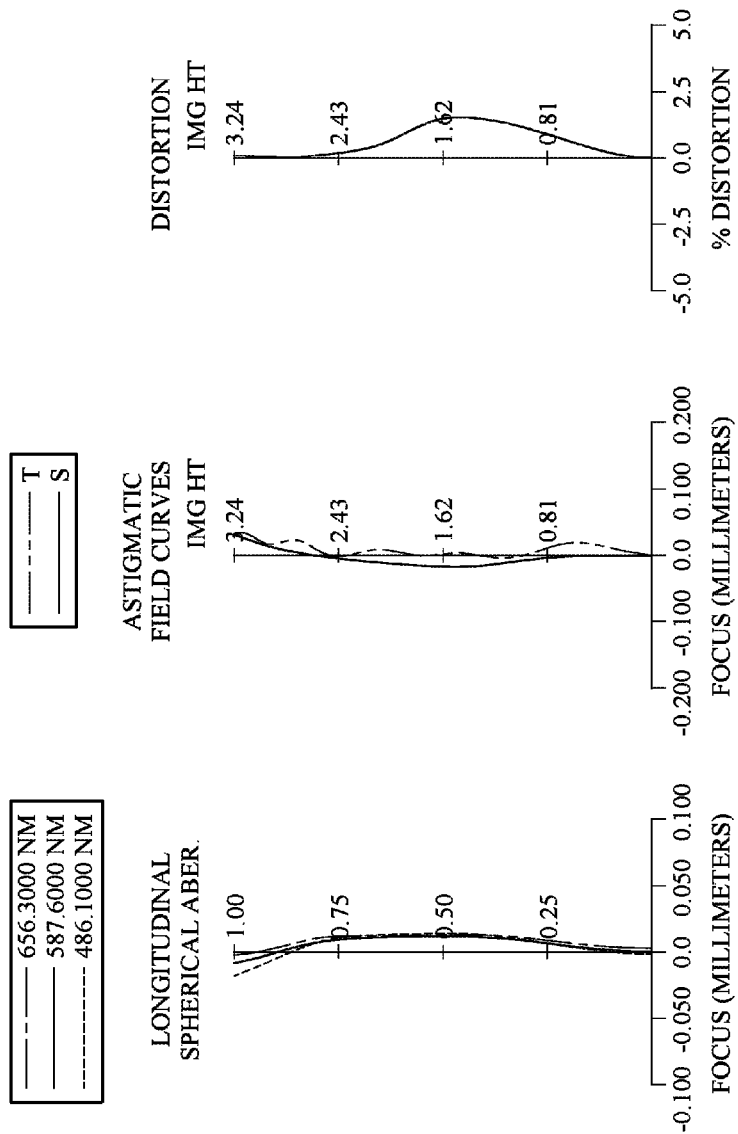
FIG. 4 shows spherical aberration curves, astigmatic field curves and a distortion curve of the image capturing unit according to the 2nd embodiment.

In Table 1, the curvature radius, the thickness and the focal length are shown in millimeters (mm). Surface numbers 0-17 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The 2nd Embodiment FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the photographing optical lens assembly has a total of six lens elements (210-260). There is an air gap in a paraxial region between every two lens elements (210-260) of the photographing optical lens assembly that are adjacent to each other.

The first lens element 210 with positive refractive power has an object-side surface being 211 convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has a shape changing from concave to convex and a shape changing from convex to concave in an off-axis region thereof.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axis region thereof.

In this embodiment, a central thickness of the sixth lens element 260 is the largest among all central thicknesses of the lens elements (210-260) of the photographing optical lens assembly.

The IR-cut filter 270 is made of glass material and located between the sixth lens element 260 and the image surface 280, and will not affect the focal length of the photographing optical lens assembly. The image sensor 290 is disposed on or near the image surface 280 of the photographing optical lens assembly.

The detailed optical data of the 2nd embodiment are shown in Table 3 and the aspheric surface data are shown in Table 4 below.

TABLE 3

2nd Embodiment
f = 3.53 mm, Fno = 2.48, HFOV = 42.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.564 (ASP) | 0.391 | Plastic | 1.545 | 56.1 | 2.92 |
| 2 | | 78.281 (ASP) | −0.020 | | | | |
| 3 | Ape. Stop | Plano | 0.075 | | | | |
| 4 | Lens 2 | 18.203 (ASP) | 0.230 | Plastic | 1.639 | 23.5 | −5.57 |
| 5 | | 2.960 (ASP) | 0.228 | | | | |
| 6 | Lens 3 | 6.266 (ASP) | 0.322 | Plastic | 1.545 | 56.1 | 13.79 |
| 7 | | 36.976 (ASP) | 0.370 | | | | |
| 8 | Lens 4 | −5.438 (ASP) | 0.300 | Plastic | 1.583 | 30.2 | −9.99 |
| 9 | | −83.186 (ASP) | 0.040 | | | | |
| 10 | Lens 5 | 2.242 (ASP) | 0.389 | Plastic | 1.545 | 56.1 | 12.60 |
| 11 | | 3.127 (ASP) | 0.246 | | | | |
| 12 | Lens 6 | 1.646 (ASP) | 0.699 | Plastic | 1.545 | 56.1 | −1140.33 |
| 13 | | 1.395 (ASP) | 0.500 | | | | |
| 14 | IR-cut filter | Plano | 0.210 | Glass | 1.517 | 64.2 | — |
| 15 | | Plano | 0.379 | | | | |
| 16 | Image | Plano | — | | | | |

Note:
Reference wavelength is 587.6 nm (d-line).

TABLE 4

Aspheric Coefficients

| Surface # | | | | | |
|---|---|---|---|---|---|
| 1 | 2 | 4 | 5 | 6 | 7 |
| k = −1.0785E+00 | 8.5421E+01 | 9.0000E+01 | 2.9755E+00 | −8.9073E+01 | −6.2534E+01 |
| A4 = −1.1918E−02 | −2.5820E−01 | −2.3981E−01 | −1.1345E−01 | −1.0505E−01 | −1.1132E−01 |
| A6 = −3.4464E−02 | 6.1630E−01 | 1.1541E+00 | 6.2592E−01 | −9.6008E−02 | 1.2061E−01 |
| A8 = −9.2771E−02 | −1.2454E+00 | −2.2610E+00 | −1.1332E+00 | 4.8815E−01 | −6.8426E−01 |
| A10 = −2.6483E−01 | 1.4727E+00 | 3.1711E+00 | 1.5105E+00 | −1.3705E+00 | 1.4338E+00 |
| A12 = 4.2102E−01 | −1.5247E+00 | −2.8064E+00 | −1.2453E+00 | 1.8478E+00 | −1.7759E+00 |
| A14 = −3.2555E−01 | 8.4326E−01 | 1.1431E+00 | 4.5845E−01 | −7.4300E−01 | 1.1494E+00 |
| A16 = — | — | — | — | — | −1.9169E−01 |

| Surface # | | | | | |
|---|---|---|---|---|---|
| 8 | 9 | 10 | 11 | 12 | 13 |
| k = 6.1752E+00 | −6.9513E+00 | −2.0330E−01 | −3.1928E+01 | −1.5105E+00 | −1.0356E+00 |
| A4 = −1.2241E−01 | −2.1946E−01 | 3.1397E−02 | 2.3391E−01 | −2.9324E−01 | −2.5211E−01 |
| A6 = 6.5707E−01 | 4.1721E−01 | −2.0519E−01 | −2.9611E−01 | 1.7020E−01 | 1.2727E−01 |
| A8 = −1.3153E+00 | −3.6929E−01 | 1.9237E−01 | 1.8614E−01 | −7.3522E−02 | −5.1738E−02 |
| A10 = 1.3493E+00 | 1.5239E−01 | −1.2613E−01 | −7.5545E−02 | 2.0737E−02 | 1.3225E−02 |
| A12 = −8.1369E−01 | −2.3900E−02 | 5.4157E−02 | 1.9162E−02 | −3.4094E−03 | −1.9784E−03 |
| A14 = 2.0261E−01 | −1.2691E−03 | −1.2873E−02 | −2.7365E−03 | 2.9683E−04 | 1.5942E−04 |
| A16 = — | 5.0553E−04 | 1.2447E−03 | 1.6592E−04 | −1.0615E−05 | −5.3393E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.53 | CT3/(T23 + T34) | 0.54 |
| Fno | 2.48 | |Sag41|/CT4 | 0.76 |
| HFOV [deg.] | 42.5 | Σ(f1/|fi|) | 1.26 |
| R6/R7 | −6.80 | (ΣCT/ImgH) + (ΣAT/ImgH) | 1.01 |
| R10/R11 | 1.90 | T23/T34 | 0.62 |
| CT4/CT3 | 0.93 | CT5/CT6 | 0.56 |
| f3/f4 | −1.38 | R10/f | 0.89 |
| R6/f | 10.47 | |R9/f| + |R10/f| | 1.52 |
| |f/f3| + |f/f4| + |f/f5| + |f/f6| | 0.89 | |Sag32|/CT3 | 0.22 |

3rd Embodiment

Figure 5:
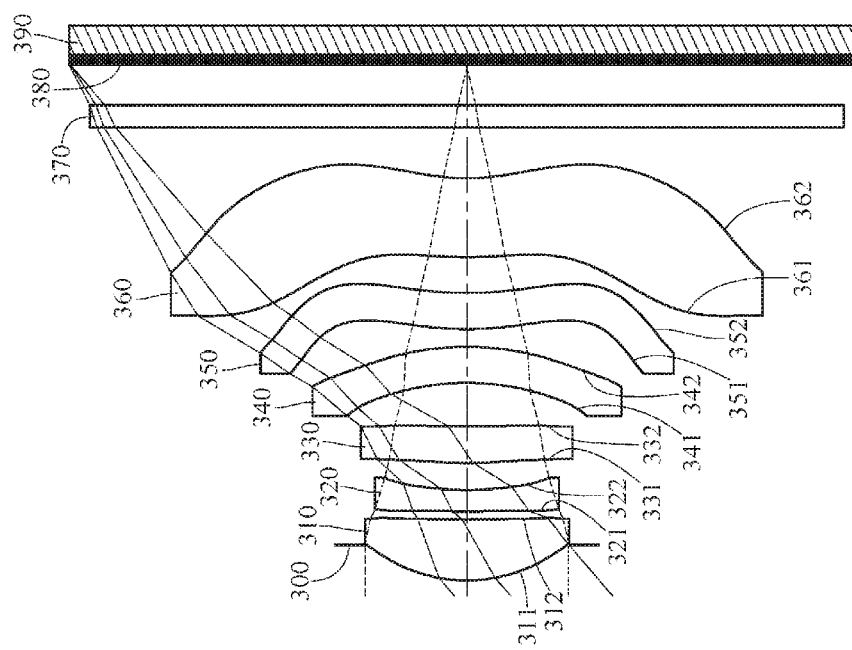
FIG. 5 is a schematic view of an image capturing unit according to the 3rd embodiment of the present disclosure.
Figure 6:
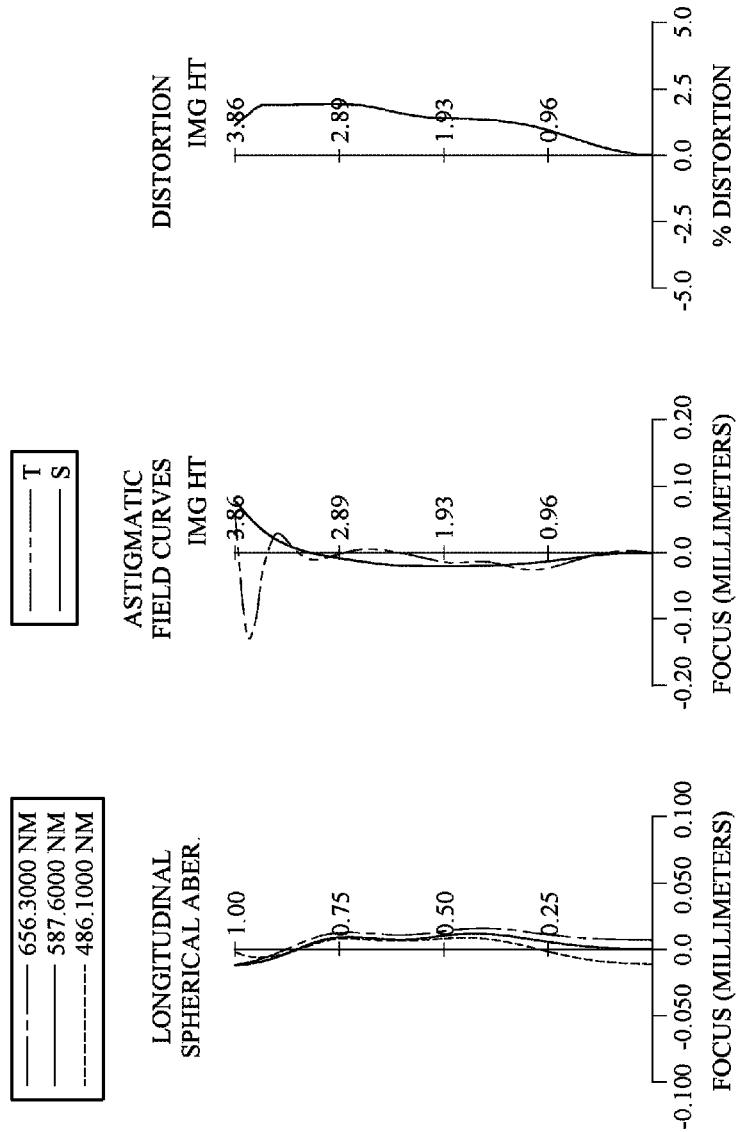
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the photographing optical lens assembly has a total of six lens elements (310-360). There is an air gap in a paraxial region between every two lens elements (310-360) of the photographing optical lens assembly that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has a shape changing from concave to convex and a shape changing from convex to concave in an off-axis region thereof.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axis region thereof.

In this embodiment, a central thickness of the sixth lens element 360 is the largest among all central thicknesses of the lens elements (310-360) of the photographing optical lens assembly.

The IR-cut filter 370 is made of glass material and located between the sixth lens element 360 and the image surface 380, and will not affect the focal length of the photographing optical lens assembly. The image sensor 390 is disposed on or near the image surface 380 of the photographing optical lens assembly.

The detailed optical data of the 3rd embodiment are shown in Table 5 and the aspheric surface data are shown in Table 6 below.

TABLE 5

3rd Embodiment
f = 4.46 mm, Fno = 2.25, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.347 | | | | |
| 2 | Lens 1 | 1.507 | (ASP) | 0.591 | Plastic | 1.544 | 55.9 | 3.36 |
| 3 | | 7.372 | (ASP) | 0.080 | | | | |
| 4 | Lens 2 | 8.293 | (ASP) | 0.210 | Plastic | 1.639 | 23.5 | −6.55 |
| 5 | | 2.753 | (ASP) | 0.263 | | | | |
| 6 | Lens 3 | 4.320 | (ASP) | 0.356 | Plastic | 1.544 | 55.9 | 12.13 |
| 7 | | 12.146 | (ASP) | 0.423 | | | | |
| 8 | Lens 4 | −2.554 | (ASP) | 0.350 | Plastic | 1.639 | 23.5 | −39.00 |
| 9 | | −2.998 | (ASP) | 0.175 | | | | |
| 10 | Lens 5 | 3.563 | (ASP) | 0.352 | Plastic | 1.544 | 55.9 | 55.47 |
| 11 | | 3.900 | (ASP) | 0.347 | | | | |
| 12 | Lens 6 | 3.671 | (ASP) | 0.769 | Plastic | 1.544 | 55.9 | −9.49 |
| 13 | | 1.988 | (ASP) | 0.500 | | | | |
| 14 | IR-cut filter | Plano | | 0.210 | Glass | 1.517 | 64.2 | — |
| 15 | | Plano | | 0.395 | | | | |
| 16 | Image | Plano | | — | | | | |

Note:
Reference wavelength is 587.6 nm (d-line).
Effective radius of the object-side surface of the fourth lens element (Surface 8) is 1.164 mm.

TABLE 6

Aspheric Coefficients

| | Surface # | | | | | |
|---|---|---|---|---|---|---|
| | 2 | 3 | 4 | 5 | 6 | 7 |
| k = | −2.7965E−01 | −8.7105E+01 | −5.2562E+01 | −1.8564E+01 | −7.0348E+01 | 4.3154E+00 |
| A4 = | 1.4242E−02 | −1.9051E−01 | −3.9458E−01 | −1.6024E−01 | −2.9428E−02 | −7.4295E−02 |
| A6 = | −5.3536E−02 | 5.3763E−01 | 1.3071E+00 | 7.8615E−01 | −1.6790E−01 | 9.0661E−02 |
| A8 = | 2.5431E−01 | −8.8598E−01 | −2.3096E+00 | −1.2397E+00 | 5.8091E−01 | −2.9079E−01 |
| A10 = | −5.3554E−01 | 1.0339E+00 | 2.7662E+00 | 1.2933E+00 | −9.7426E−01 | 5.9338E−01 |
| A12 = | 5.3484E−01 | −8.0227E−01 | −2.0252E+00 | −7.6914E−01 | 8.1724E−01 | −6.5192E−01 |
| A14 = | −2.1537E−01 | 2.4811E−01 | 6.3538E−01 | 2.2149E−01 | −2.4175E−01 | 3.4797E−01 |
| A16 = | — | — | — | — | — | −5.8205E−02 |

| | Surface # | | | | | |
|---|---|---|---|---|---|---|
| | 8 | 9 | 10 | 11 | 12 | 13 |
| k = | 1.7878E+00 | −5.1109E+00 | −2.1244E+01 | −3.2495E+01 | −1.1030E+00 | −1.0468E+00 |
| A4 = | −6.8666E−03 | −3.7404E−02 | 9.7859E−02 | 8.4751E−02 | −2.0039E−01 | −1.7482E−01 |
| A6 = | 7.9803E−02 | −4.4050E−02 | −2.4488E−01 | −1.6373E−01 | 5.9626E−02 | 7.0439E−02 |
| A8 = | −1.6716E−01 | 8.4526E−02 | 1.9756E−01 | 1.0495E−01 | −1.2140E−02 | −2.4761E−02 |
| A10 = | 2.2559E−01 | −4.4972E−02 | −9.4145E−02 | −4.0060E−02 | 2.8000E−03 | 6.0807E−03 |
| A12 = | −1.5376E−01 | 1.0460E−02 | 2.1918E−02 | 7.8258E−03 | −5.1121E−04 | −9.0281E−04 |
| A14 = | 3.5470E−02 | −1.0893E−03 | −1.8599E−03 | −5.8641E−04 | 4.9985E−05 | 7.0868E−05 |
| A16 = | — | — | — | — | −1.9212E−06 | −2.2352E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.46 | CT3/(T23 + T34) | 0.52 |
| Fno | 2.25 | |Sag41|/CT4 | 0.92 |
| HFOV [deg.] | 40.5 | Σ(f1/|fi|) | 1.29 |
| R6/R7 | −4.76 | (ΣCT/ImgH) + (ΣAT/ImgH) | 1.02 |
| R10/R11 | 1.06 | T23/T34 | 0.62 |
| CT4/CT3 | 0.98 | CT5/CT6 | 0.46 |
| f3/f4 | −0.31 | R10/f | 0.87 |
| R6/f | 2.72 | |R9/f| + |R10/f| | 1.67 |
| |f/f3| + |f/f4| + |f/f5| + |f/f6| | 1.03 | |Sag32|/CT3 | 0.004 |

4th Embodiment

Figure 7:
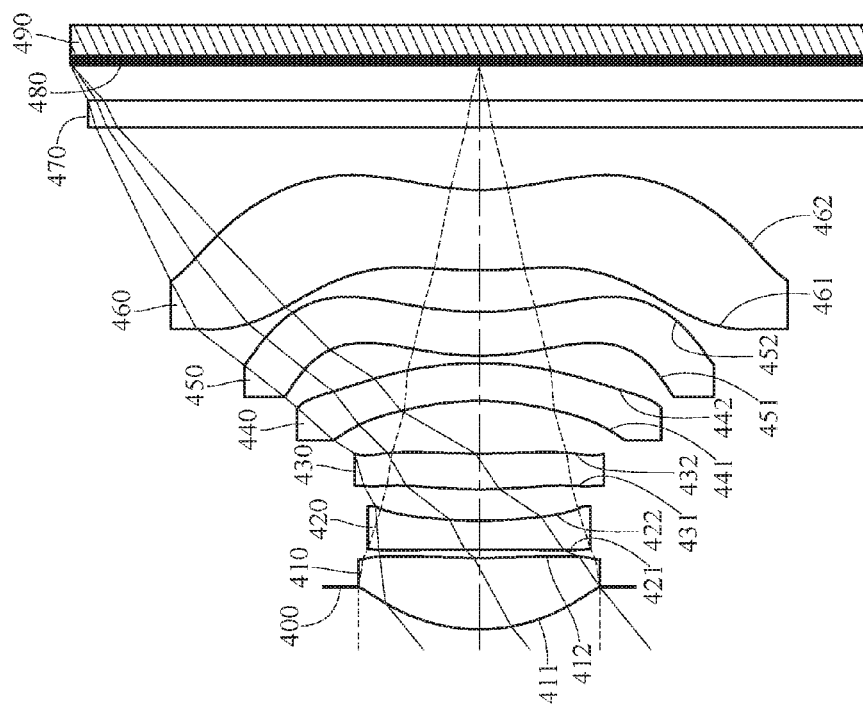
FIG. 7 is a schematic view of an image capturing unit according to the 4th embodiment of the present disclosure.
Figure 8:
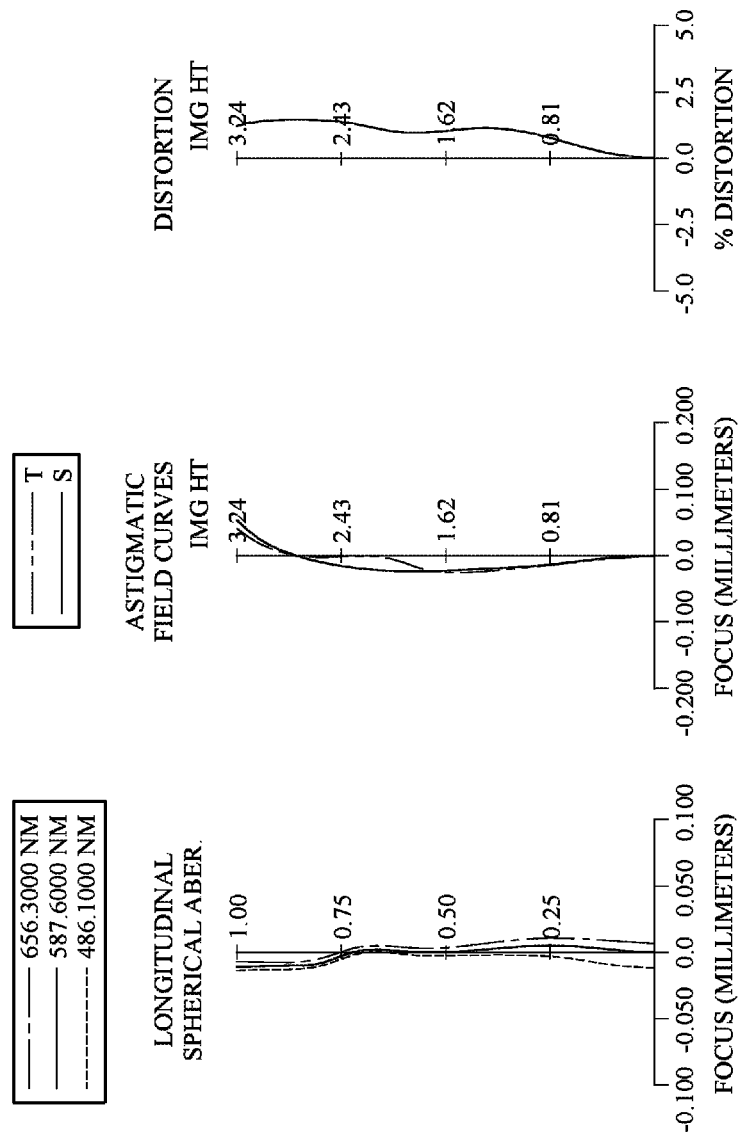
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, an aperture stop 400, a first lens element 410, a second lens element 420, a third lens element 430, a fourth lens element 440, a fifth lens element 450, a sixth lens element 460, a IR-cut filter 470 and an image surface 480, wherein the photographing optical lens assembly has a total of six lens elements (410-460). There is an air gap in a paraxial region between every two lens elements (410-460) of the photographing optical lens assembly that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has a shape changing from concave to convex and a shape changing from convex to concave in an off-axis region thereof.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axis region thereof.

In this embodiment, a central thickness of the sixth lens element 460 is the largest among all central thicknesses of the lens elements (410-460) of the photographing optical lens assembly.

The IR-cut filter 470 is made of glass material and located between the sixth lens element 460 and the image surface 480, and will not affect the focal length of the photographing optical lens assembly. The image sensor 490 is disposed on or near the image surface 480 of the photographing optical lens assembly.

The detailed optical data of the 4th embodiment are shown in Table 7 and the aspheric surface data are shown in Table 8 below.

TABLE 7

4th Embodiment
f = 3.94 mm, Fno = 2.05, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.336 | | | | |
| 2 | Lens 1 | 1.419 | (ASP) | 0.568 | Plastic | 1.544 | 56.0 | 3.28 |
| 3 | | 5.912 | (ASP) | 0.068 | | | | |
| 4 | Lens 2 | 12.327 | (ASP) | 0.230 | Plastic | 1.639 | 23.3 | −7.01 |
| 5 | | 3.260 | (ASP) | 0.248 | | | | |
| 6 | Lens 3 | 3.264 | (ASP) | 0.286 | Plastic | 1.544 | 56.0 | 10.28 |
| 7 | | 7.595 | (ASP) | 0.419 | | | | |
| 8 | Lens 4 | −2.189 | (ASP) | 0.300 | Plastic | 1.639 | 23.3 | −18.07 |

TABLE 7-continued

4th Embodiment
f = 3.94 mm, Fno = 2.05, HFOV = 39.1 deg.

| Surface # | | Curvature Radius | Thickness | Material | Index | Abbe # | Focal Length |
|---|---|---|---|---|---|---|---|
| 9 | | −2.846 (ASP) | 0.060 | | | | |
| 10 | Lens 5 | 2.243 (ASP) | 0.350 | Plastic | 1.544 | 56.0 | 20.50 |
| 11 | | 2.653 (ASP) | 0.329 | | | | |
| 12 | Lens 6 | 3.120 (ASP) | 0.641 | Plastic | 1.535 | 55.8 | −8.87 |
| 13 | | 1.747 (ASP) | 0.500 | | | | |
| 14 | IR-cut filter | Plano | 0.210 | Glass | 1.517 | 64.2 | — |
| 15 | | Plano | 0.283 | | | | |
| 16 | Image | Plano | — | | | | |

Note:
Reference wavelength is 587.6 nm (d-line).
Effective radius of the object-side surface of the fourth lens element (Surface 8) is 1.160 mm.

TABLE 8

Aspheric Coefficients

| | Surface # | | | | | |
|---|---|---|---|---|---|---|
| | 2 | 3 | 4 | 5 | 6 | 7 |
| k = | −4.3092E−01 | −5.2311E+01 | 9.0000E+01 | −2.3461E+01 | −8.8464E+01 | −8.9854E+01 |
| A4 = | 1.4762E−02 | −2.5802E−01 | −4.6613E−01 | −2.1056E−01 | 9.3263E−02 | −8.4412E−02 |
| A6 = | −2.7778E−02 | 6.4625E−01 | 1.4658E+00 | 8.9170E−01 | −9.1297E−01 | 1.3740E−01 |
| A8 = | 1.9872E−01 | −1.0781E+00 | −2.6664E+00 | −1.3593E+00 | 2.4522E+00 | −9.4172E−01 |
| A10 = | −5.2291E−01 | 1.3302E+00 | 3.4372E+00 | 1.2343E+00 | −4.1444E+00 | 2.3015E+00 |
| A12 = | 6.0108E−01 | −1.1583E+00 | −2.7174E+00 | −3.5023E−01 | 3.8664E+00 | −3.0055E+00 |
| A14 = | −2.9286E−01 | 4.1091E−01 | 9.2656E−01 | −8.4304E−02 | −1.3882E+00 | 2.0962E+00 |
| A16 = | — | — | — | — | — | −5.4856E−01 |

| | Surface # | | | | | |
|---|---|---|---|---|---|---|
| | 8 | 9 | 10 | 11 | 12 | 13 |
| k = | 6.3263E−01 | −1.4409E+01 | −1.0223E+01 | −2.4813E+01 | −1.4990E+00 | −1.1551E+00 |
| A4 = | 9.3045E−02 | −7.4113E−02 | 5.7424E−02 | 1.3482E−01 | −2.9507E−01 | −2.5917E−01 |
| A6 = | 3.9415E−02 | 3.4113E−02 | −2.8407E−01 | −2.6768E−01 | 1.5480E−01 | 1.4473E−01 |
| A8 = | −2.4330E−01 | 1.1347E−02 | 3.2021E−01 | 2.0770E−01 | −6.8355E−02 | −7.0502E−02 |
| A10 = | 2.5931E−01 | −2.4556E−02 | −2.6921E−01 | −1.0762E−01 | 2.3769E−02 | 2.3067E−02 |
| A12 = | −1.4991E−01 | 1.9008E−02 | 1.4668E−01 | 3.5370E−02 | −5.0409E−03 | −4.4790E−03 |
| A14 = | 3.9969E−02 | −6.3702E−03 | −4.4694E−02 | −6.5465E−03 | 5.6232E−04 | 4.5982E−04 |
| A16 = | — | 5.0668E−04 | 5.6531E−03 | 5.1355E−04 | −2.5396E−05 | −1.9050E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.94 | CT3/(T23 + T34) | 0.43 |
| Fno | 2.05 | |Sag41|/CT4 | 1.05 |
| HFOV [deg.] | 39.1 | Σ(f1/|fi|) | 1.50 |
| R6/R7 | −3.47 | (ΣCT/ImgH) + (ΣAT/ImgH) | 1.08 |
| R10/R11 | 0.85 | T23/T34 | 0.59 |
| CT4/CT3 | 1.05 | CT5/CT6 | 0.55 |
| f3/f4 | −0.57 | R10/f | 0.67 |
| R6/f | 1.93 | |R9/f| + |R10/f| | 1.24 |
| |f/f3| + |f/f4| + |f/f5| + |f/f6| | 1.24 | |Sag32|/CT3 | 0.002 |

5th Embodiment

Figure 9:
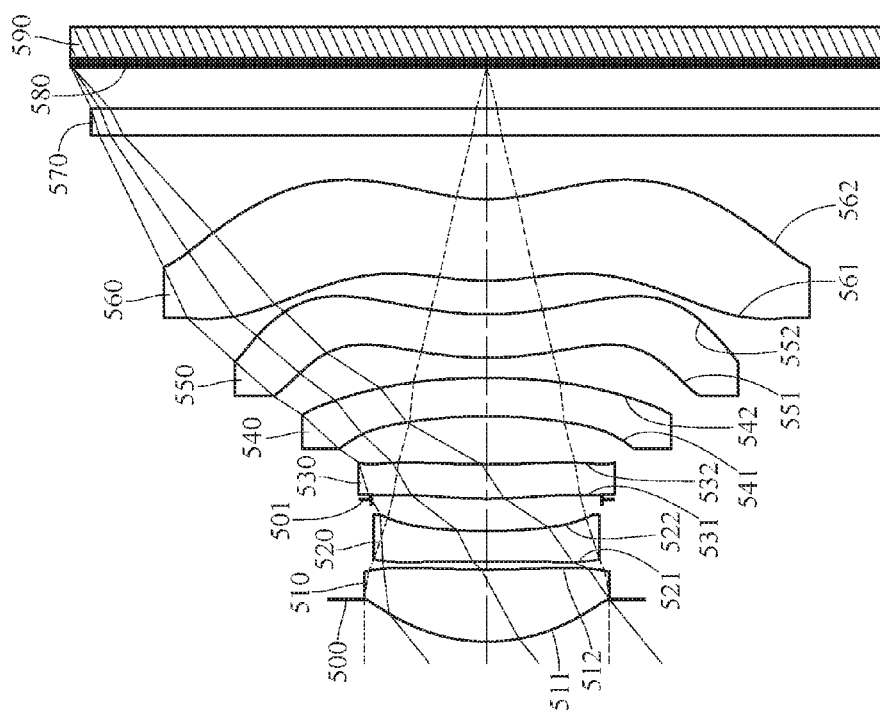
FIG. 9 is a schematic view of an image capturing unit according to the 5th embodiment of the present disclosure.
Figure 10:
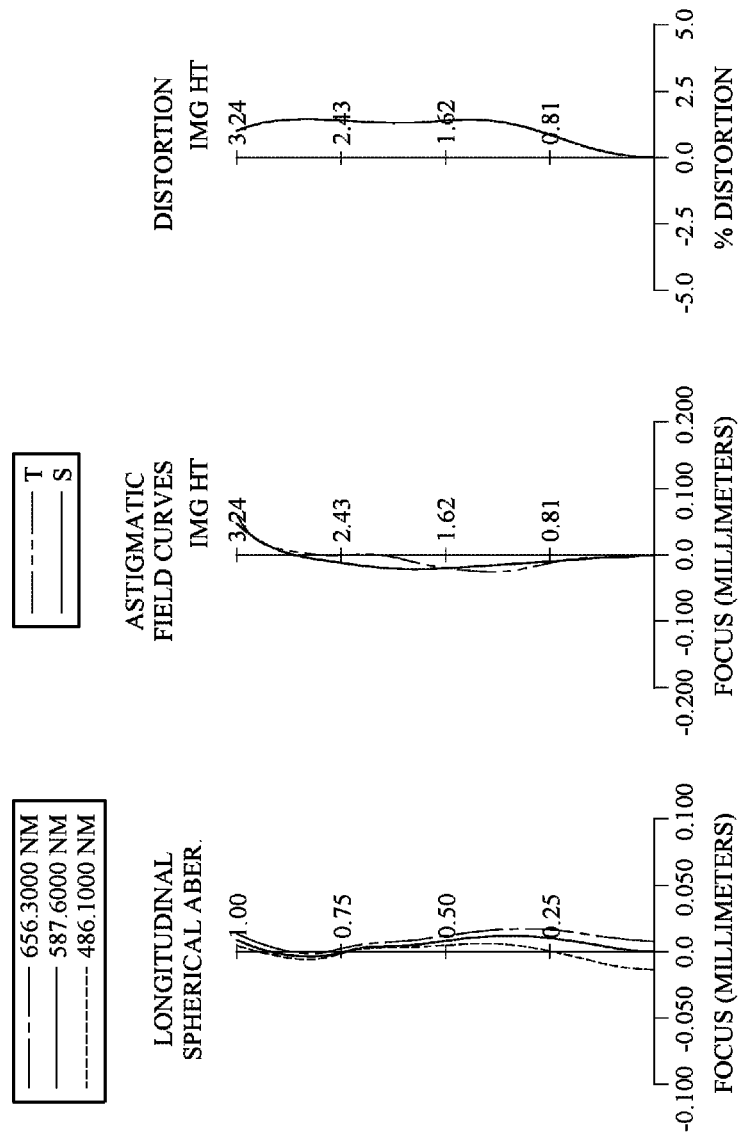
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, an aperture stop 500, a first lens element 510, a second lens element 520, a stop 501, a third lens element 530, a fourth lens element 540, a fifth lens element 550, a sixth lens element 560, an IR-cut filter 570 and an image surface 580, wherein the photographing optical lens assembly has a total of six lens elements (510-560). There is an air gap in a paraxial region between every two lens elements (510-560) of the photographing optical lens assembly that are adjacent to each other. The stop 501, for example, is a glare stop or a field stop.

The first lens element 510 with positive refractive power has an object-side surface 511 convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has a shape changing from concave to convex and a shape changing from convex to concave in an off-axis region thereof.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axis region thereof.

In this embodiment, a central thickness of the sixth lens element 560 is the largest among all central thicknesses of the lens elements (510-560) of the photographing optical lens assembly.

The IR-cut filter 570 is made of glass material and located between the sixth lens element 560 and the image surface 580, and will not affect the focal length of the photographing optical lens assembly. The image sensor 590 is disposed on or near the image surface 580 of the photographing optical lens assembly.

The detailed optical data of the 5th embodiment are shown in Table 9 and the aspheric surface data are shown in Table 10 below.

TABLE 9

5th Embodiment
f = 3.93 mm, Fno = 2.05, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.333 | | | | |
| 2 | Lens 1 | 1.408 | (ASP) | 0.565 | Plastic | 1.544 | 56.0 | 3.27 |
| 3 | | 5.764 | (ASP) | 0.063 | | | | |
| 4 | Lens 2 | 11.786 | (ASP) | 0.237 | Plastic | 1.639 | 23.3 | −7.18 |
| 5 | | 3.276 | (ASP) | 0.247 | | | | |
| 6 | Stop | Plano | | 0.007 | | | | |
| 7 | Lens 3 | 3.354 | (ASP) | 0.269 | Plastic | 1.544 | 56.0 | 14.69 |
| 8 | | 5.612 | (ASP) | 0.376 | | | | |
| 9 | Lens 4 | −4.548 | (ASP) | 0.300 | Plastic | 1.639 | 23.3 | −30.64 |
| 10 | | −6.077 | (ASP) | 0.158 | | | | |
| 11 | Lens 5 | 2.535 | (ASP) | 0.340 | Plastic | 1.544 | 56.0 | −136.70 |
| 12 | | 2.335 | (ASP) | 0.263 | | | | |
| 13 | Lens 6 | 1.920 | (ASP) | 0.639 | Plastic | 1.535 | 55.8 | −24.97 |
| 14 | | 1.484 | (ASP) | 0.500 | | | | |
| 15 | IR-cut filter | Plano | | 0.210 | Glass | 1.517 | 64.2 | — |
| 16 | | Plano | | 0.317 | | | | |
| 17 | Image | Plano | | — | | | | |

Note:
Reference wavelength is 587.6 nm (d-line).
Effective radius of the stop (Surface 6) is 0.900 mm.

TABLE 10

Aspheric Coefficients

| | Surface # | | | | | |
|---|---|---|---|---|---|---|
| | 2 | 3 | 4 | 5 | 7 | 8 |
| k = | −4.4753E−01 | −9.0000E+01 | 9.0000E+01 | −1.3625E+01 | −8.8464E+01 | −6.2533E+01 |
| A4 = | 1.3207E−02 | −2.5719E−01 | −4.6049E−01 | −2.0153E−01 | 5.7959E−02 | −1.0986E−01 |
| A6 = | −2.6361E−02 | 6.4774E−01 | 1.4696E+00 | 9.0096E−01 | −7.0493E−01 | 2.6390E−01 |
| A8 = | 1.9958E−01 | −1.0807E+00 | −2.6641E+00 | −1.3523E+00 | 1.9071E+00 | −1.2016E+00 |

TABLE 10-continued

| Aspheric Coefficients | | | | | |
|---|---|---|---|---|---|
| A10 = | −5.2733E−01 | 1.3321E+00 | 3.4353E+00 | 1.2359E+00 | −3.2513E+00 | 2.6793E+00 |
| A12 = | 5.8979E−01 | −1.1441E+00 | −2.7171E+00 | −3.5620E−01 | 3.1249E+00 | −3.3963E+00 |
| A14 = | −2.8265E−01 | 3.9983E−01 | 9.2684E−01 | −1.0160E−01 | −1.1766E+00 | 2.3631E+00 |
| A16 = | — | — | — | — | — | −6.4904E−01 |

| | Surface # | | | | |
|---|---|---|---|---|---|
| | 9 | 10 | 11 | 12 | 13 | 14 |
| k = | 6.1779E+00 | −6.9501E+00 | −3.6869E+00 | −2.3302E+01 | −2.3504E+00 | −1.2382E+00 |
| A4 = | −4.4549E−02 | −8.7762E−02 | −3.2320E−02 | 6.6027E−02 | −3.6555E−01 | −2.8559E−01 |
| A6 = | 1.9293E−01 | 6.4387E−02 | −6.6263E−02 | −9.1677E−02 | 2.2728E−01 | 1.5899E−01 |
| A8 = | −3.6826E−01 | 4.7749E−02 | 2.9194E−02 | 3.3696E−02 | −9.1453E−02 | −6.9330E−02 |
| A10 = | 3.2151E−01 | −1.5246E−01 | −7.8166E−03 | −5.6907E−03 | 2.4369E−02 | 1.9664E−02 |
| A12 = | −1.8628E−01 | 1.2853E−01 | −3.6349E−03 | −4.7754E−04 | −3.9839E−03 | −3.3041E−03 |
| A14 = | 5.2335E−02 | −4.7054E−02 | 3.0049E−03 | 3.2523E−04 | 3.5877E−04 | 2.9711E−04 |
| A16 = | — | 6.3649E−03 | −4.7518E−04 | −3.2129E−05 | −1.3613E−05 | −1.0951E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.93 | CT3/(T23 + T34) | 0.43 |
| Fno | 2.05 | |Sag41|/CT4 | 0.85 |
| HFOV [deg.] | 39.2 | Σ(f1/|fi|) | 0.94 |
| R6/R7 | −1.23 | (ΣCT/ImgH) + (ΣAT/ImgH) | 1.07 |
| R10/R11 | 1.22 | T23/T34 | 0.68 |
| CT4/CT3 | 1.12 | CT5/CT6 | 0.53 |
| f3/f4 | −0.48 | R10/f | 0.59 |
| R6/f | 1.43 | |R9/f| + |R10/f| | 1.24 |
| |f/f3| + |f/f4| + |f/f5| + |f/f6| | 0.58 | |Sag32|/CT3 | 0.06 |

6th Embodiment

Figure 11:
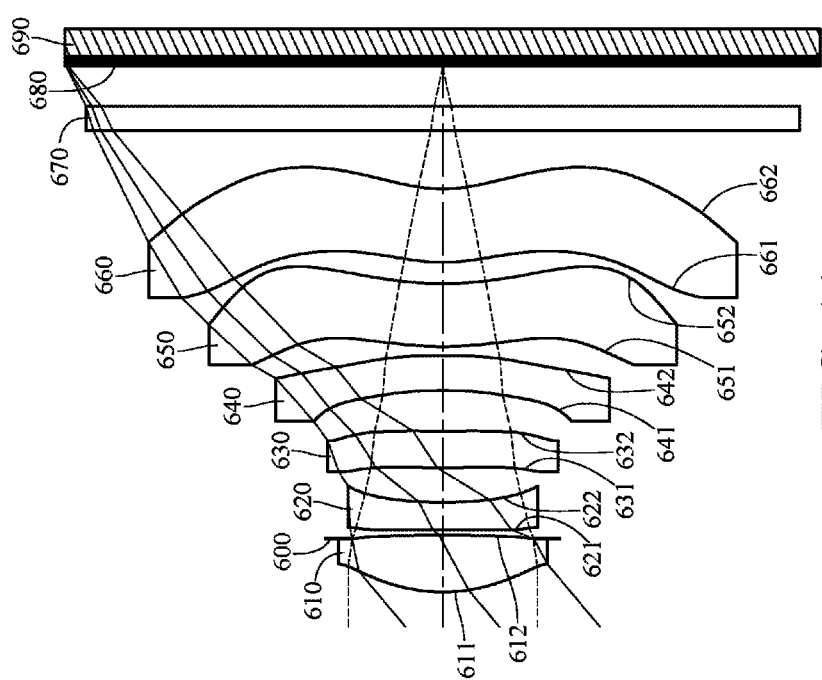
FIG. 11 is a schematic view of an image capturing unit according to the 6th embodiment of the present disclosure.
Figure 12:
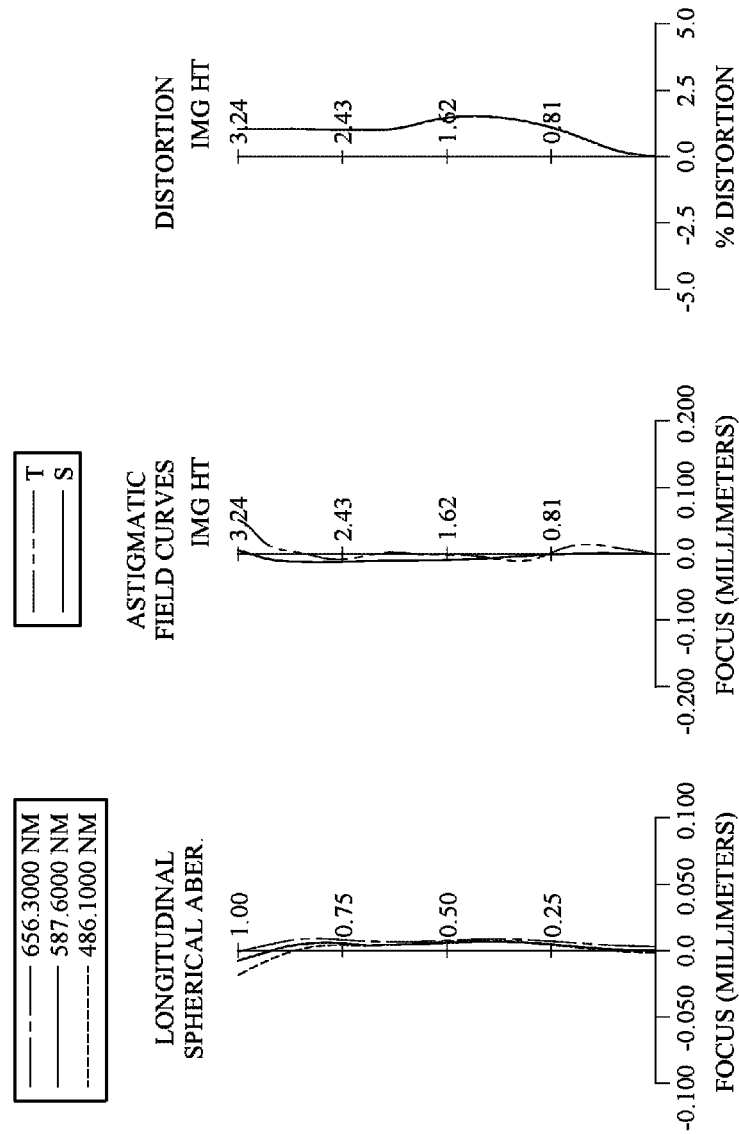
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the photographing optical lens assembly has a total of six lens elements (610-660). There is an air gap in a paraxial region between every two lens elements (610-660) of the photographing optical lens assembly that are adjacent to each other.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has a shape changing from concave to convex and a shape changing from convex to concave in an off-axis region thereof.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axis region thereof.

In this embodiment, a central thickness of the sixth lens element 660 is the largest among all central thicknesses of the lens elements (610-660) of the photographing optical lens assembly.

The IR-cut filter 670 is made of glass material and located between the sixth lens element 660 and the image surface 680, and will not affect the focal length of the photographing optical lens assembly. The image sensor 690 is disposed on or near the image surface 680 of the photographing optical lens assembly.

The detailed optical data of the 6th embodiment are shown in Table 11 and the aspheric surface data are shown in Table 12 below.

TABLE 11

6th Embodiment
f = 3.81 mm, Fno = 2.35, HFOV = 40.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.465 (ASP) | 0.487 | Plastic | 1.544 | 56.0 | 2.66 |
| 2 | | −100.000 (ASP) | −0.030 | | | | |
| 3 | Ape. Stop | Plano | 0.080 | | | | |
| 4 | Lens 2 | −92.497 (ASP) | 0.233 | Plastic | 1.633 | 23.4 | −5.32 |
| 5 | | 3.494 (ASP) | 0.297 | | | | |
| 6 | Lens 3 | 9.353 (ASP) | 0.317 | Plastic | 1.544 | 56.0 | 26.82 |
| 7 | | 25.741 (ASP) | 0.349 | | | | |
| 8 | Lens 4 | −3.854 (ASP) | 0.300 | Plastic | 1.583 | 30.2 | −11.63 |
| 9 | | −9.180 (ASP) | 0.077 | | | | |
| 10 | Lens 5 | 2.766 (ASP) | 0.542 | Plastic | 1.544 | 56.0 | 42.88 |
| 11 | | 2.921 (ASP) | 0.183 | | | | |
| 12 | Lens 6 | 1.537 (ASP) | 0.633 | Plastic | 1.544 | 56.0 | 285.94 |
| 13 | | 1.327 (ASP) | 0.500 | | | | |
| 14 | IR-cut filter | Plano | 0.210 | Glass | 1.517 | 64.2 | — |
| 15 | | Plano | 0.347 | | | | |
| 16 | Image | Plano | — | | | | |

Note:
Reference wavelength is 587.6 nm (d-line).
Effective radius of the aperture stop (Surface 3) is 0.778 mm.

TABLE 12

Aspheric Coefficients

| Surface # | 1 | 2 | 4 | 5 | 6 | 7 |
|---|---|---|---|---|---|---|
| k = | −6.0222E−01 | 8.5952E+01 | −9.0000E+01 | 4.5965E+00 | −8.9073E+01 | −6.2534E+01 |
| A4 = | 4.3670E−03 | −1.5095E−01 | −1.4067E−01 | −5.3163E−02 | −1.4212E−01 | −1.6575E−01 |
| A6 = | 7.5789E−03 | 4.7403E−01 | 8.3802E−01 | 4.4921E−01 | −3.2944E−01 | 3.1342E−01 |
| A8 = | −5.7965E−02 | −1.1240E+00 | −1.8809E+00 | −9.9246E−01 | 1.0634E−01 | −1.0541E+00 |
| A10 = | −7.0520E−02 | 1.6291E+00 | 2.9039E+00 | 1.8079E+00 | −3.4447E−01 | 1.7968E+00 |
| A12 = | 1.0975E−01 | −1.6595E+00 | −2.6733E+00 | −1.8595E+00 | 4.5650E−01 | −1.8350E+00 |
| A14 = | −1.4337E−01 | 7.3746E−01 | 1.1132E+00 | 8.7050E−01 | −6.3210E−02 | 1.0118E+00 |
| A16 = | — | — | — | — | — | −1.6717E−01 |

| Surface # | 8 | 9 | 10 | 11 | 12 | 13 |
|---|---|---|---|---|---|---|
| k = | 6.1864E+00 | −6.9513E+00 | 1.2681E+00 | −2.6746E+01 | −2.0816E+00 | −1.1182E+00 |
| A4 = | −1.7675E−01 | −3.4704E−01 | −1.5035E−01 | 6.1329E−02 | −3.9478E−01 | −3.2041E−01 |
| A6 = | 6.6994E−01 | 6.3543E−01 | 7.9889E−02 | −6.3873E−02 | 3.0284E−01 | 1.8703E−01 |
| A8 = | −9.6952E−01 | −5.4570E−01 | −1.1264E−01 | 1.3195E−02 | −1.4365E−01 | −8.0653E−02 |
| A10 = | 7.0582E−01 | 2.4606E−01 | 7.5525E−02 | 3.9339E−03 | 3.9799E−02 | 2.1788E−02 |
| A12 = | −3.0633E−01 | −5.2953E−02 | −2.5765E−02 | −3.3845E−03 | −6.2406E−03 | −3.4209E−03 |
| A14 = | 5.6119E−02 | 2.7744E−03 | 4.6998E−03 | 7.9197E−04 | 5.1651E−04 | 2.8412E−04 |
| A16 = | — | 4.2184E−04 | −3.8754E−04 | −6.1775E−05 | −1.7612E−05 | −9.6181E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.81 | CT3/(T23 + T34) | 0.49 |
| Fno | 2.35 | |Sag41|/CT4 | 0.89 |
| HFOV [deg.] | 40.0 | Σ(f1/|fi|) | 0.90 |
| R6/R7 | −6.68 | (ΣCT/ImgH) + (ΣAT/ImgH) | 1.07 |
| R10/R11 | 1.90 | T23/T34 | 0.85 |
| CT4/CT3 | 0.95 | CT5/CT6 | 0.86 |
| f3/f4 | −2.31 | R10/f | 0.77 |
| R6/f | 6.76 | |R9/f| + |R10/f| | 1.49 |
| |f/f3| + |f/f4| + |f/f5| + |f/f6| | 0.57 | |Sag32|/CT3 | 0.26 |

7th Embodiment

Figure 13:
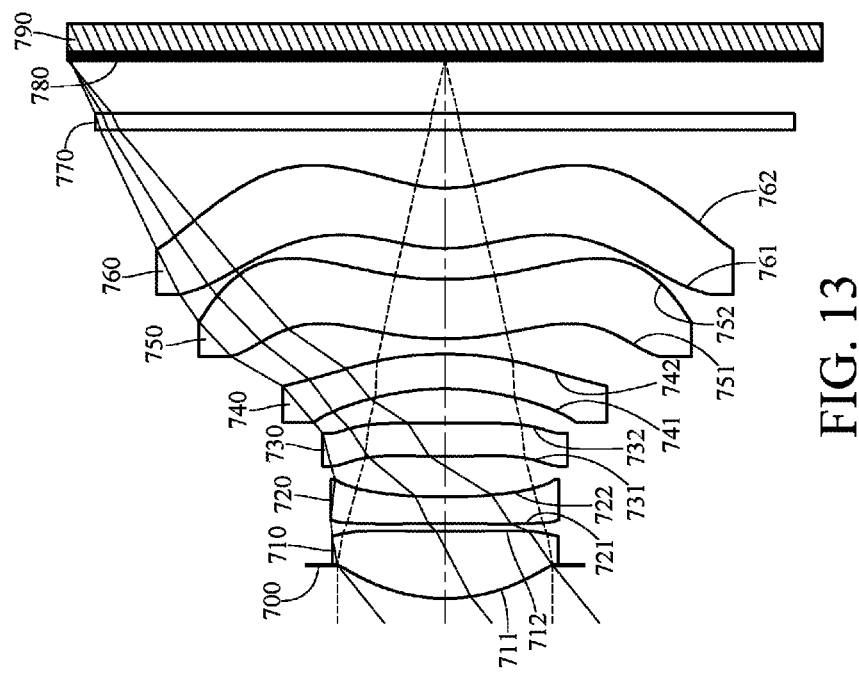
FIG. 13 is a schematic view of an image capturing unit according to the 7th embodiment of the present disclosure.
Figure 14:
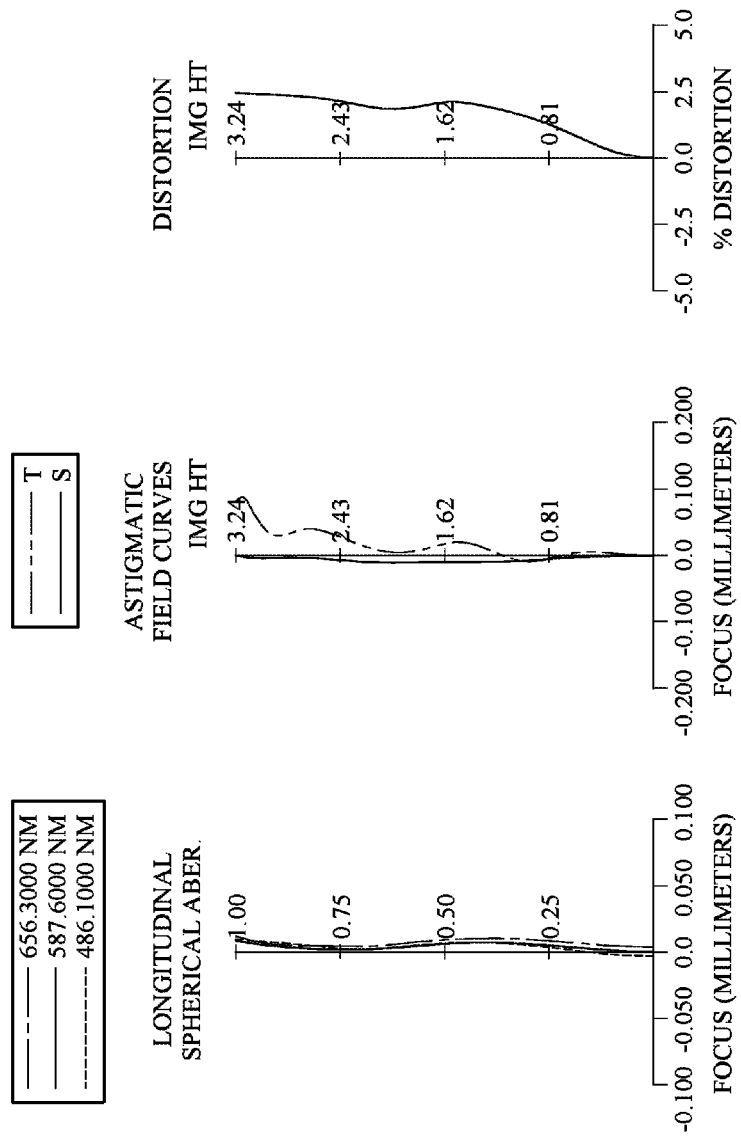
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the photographing optical lens assembly has a total of six lens elements (710-760). There is an air gap in a paraxial region between every two lens elements (710-760) of the photographing optical lens assembly that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being planar in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has a shape changing from concave to convex and a shape changing from convex to concave in an off-axis region thereof.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axis region thereof.

The IR-cut filter 770 is made of glass material and located between the sixth lens element 760 and the image surface 780, and will not affect the focal length of the photographing optical lens assembly. The image sensor 790 is disposed on or near the image surface 780 of the photographing optical lens assembly.

The detailed optical data of the 7th embodiment are shown in Table 13 and the aspheric surface data are shown in Table 14 below.

TABLE 13

7th Embodiment
f = 3.89 mm, Fno = 2.10, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.287 | | | | |
| 2 | Lens 1 | 1.519 | (ASP) | 0.577 | Plastic | 1.544 | 56.0 | 3.01 |
| 3 | | 18.369 | (ASP) | 0.067 | | | | |
| 4 | Lens 2 | ∞ | (ASP) | 0.230 | Plastic | 1.660 | 20.4 | −6.99 |
| 5 | | 4.615 | (ASP) | 0.350 | | | | |
| 6 | Lens 3 | 8.218 | (ASP) | 0.286 | Plastic | 1.544 | 56.0 | 32.89 |
| 7 | | 15.013 | (ASP) | 0.297 | | | | |
| 8 | Lens 4 | −2.378 | (ASP) | 0.300 | Plastic | 1.639 | 23.5 | −20.73 |
| 9 | | −3.041 | (ASP) | 0.132 | | | | |
| 10 | Lens 5 | 2.641 | (ASP) | 0.510 | Plastic | 1.544 | 56.0 | −140.89 |
| 11 | | 2.379 | (ASP) | 0.268 | | | | |
| 12 | Lens 6 | 1.313 | (ASP) | 0.520 | Plastic | 1.544 | 56.0 | 42.36 |
| 13 | | 1.198 | (ASP) | 0.500 | | | | |
| 14 | IR-cut filter | Plano | | 0.145 | Glass | 1.517 | 64.2 | — |
| 15 | | Plano | | 0.453 | | | | |
| 16 | Image | Plano | | — | | | | |

Note:
Reference wavelength is 587.6 nm (d-line).

TABLE 14

Aspheric Coefficients

| | Surface # | | | | | |
|---|---|---|---|---|---|---|
| | 2 | 3 | 4 | 5 | 6 | 7 |
| k = | −4.5242E−01 | 9.0000E+01 | 0.0000E+00 | 4.0173E+00 | −7.3598E+01 | 4.1074E+01 |
| A4 = | 4.3368E−03 | −9.2227E−02 | −7.5624E−02 | −2.5366E−02 | −1.8899E−01 | −2.1427E−01 |
| A6 = | 2.3676E−02 | 2.5667E−01 | 3.2462E−01 | 1.5813E−01 | 3.7414E−01 | 5.8502E−01 |
| A8 = | −4.1573E−02 | −5.8184E−01 | −4.3371E−01 | −1.4869E−01 | −1.9629E+00 | −1.9856E+00 |
| A10 = | −1.2364E−02 | 6.9119E−01 | 1.6731E−01 | −1.5237E−02 | 4.9916E+00 | 3.5446E+00 |
| A12 = | 7.1334E−02 | −5.8133E−01 | 8.8371E−02 | 1.7848E−01 | −7.4240E+00 | −3.7976E+00 |
| A14 = | −8.7020E−02 | 2.2742E−01 | −3.1152E−02 | −6.7710E−02 | 6.0133E+00 | 2.3187E+00 |
| A16 = | 7.2094E−03 | −3.0995E−03 | 1.2539E−03 | −1.6999E−03 | −1.9476E+00 | −5.7637E−01 |

| | Surface # | | | | | |
|---|---|---|---|---|---|---|
| | 8 | 9 | 10 | 11 | 12 | 13 |
| k = | −7.8475E+00 | −1.4975E+01 | −5.7154E−01 | −3.1118E+01 | −5.4354E+00 | −9.5419E−01 |
| A4 = | −1.3188E−01 | −1.1688E−01 | 8.0268E−02 | 1.0656E−01 | −2.3222E−01 | −3.6711E−01 |
| A6 = | 3.9837E−01 | 1.4106E−01 | −1.3906E−01 | −1.2339E−01 | 1.1181E−01 | 2.0661E−01 |
| A8 = | −6.1468E−01 | −1.3684E−01 | 1.0429E−01 | 6.1796E−02 | −3.7307E−02 | −9.2037E−02 |
| A10 = | 3.5177E−01 | 8.8338E−02 | −5.1139E−02 | −2.0404E−02 | 8.3744E−03 | 2.5911E−02 |
| A12 = | −5.6586E−03 | −1.3934E−02 | 1.5352E−02 | 4.2200E−03 | −1.1709E−03 | −4.2499E−03 |
| A14 = | −3.9122E−02 | −1.0179E−02 | −2.3573E−03 | −5.0451E−04 | 9.7018E−05 | 3.7080E−04 |
| A16 = | −2.6498E−03 | 3.2433E−03 | 1.4007E−04 | 2.6888E−05 | −3.8352E−06 | −1.3265E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.89 | CT3/(T23 + T34) | 0.44 |
| Fno | 2.10 | |Sag41|/CT4 | 0.97 |
| HFOV [deg.] | 39.0 | Σ(f1/|fi|) | 0.76 |
| R6/R7 | −6.31 | (ΣCT/ImgH) + (ΣAT/ImgH) | 1.09 |
| R10/R11 | 1.81 | T23/T34 | 1.18 |
| CT4/CT3 | 1.05 | CT5/CT6 | 0.98 |
| f3/f4 | −1.59 | R10/f | 0.61 |
| R6/f | 3.86 | |R9/f| + |R10/f| | 1.29 |
| |f/f3| + |f/f4| + |f/f5| + |f/f6| | 0.43 | |Sag32|/CT3 | 0.29 |

8th Embodiment

Figure 15:
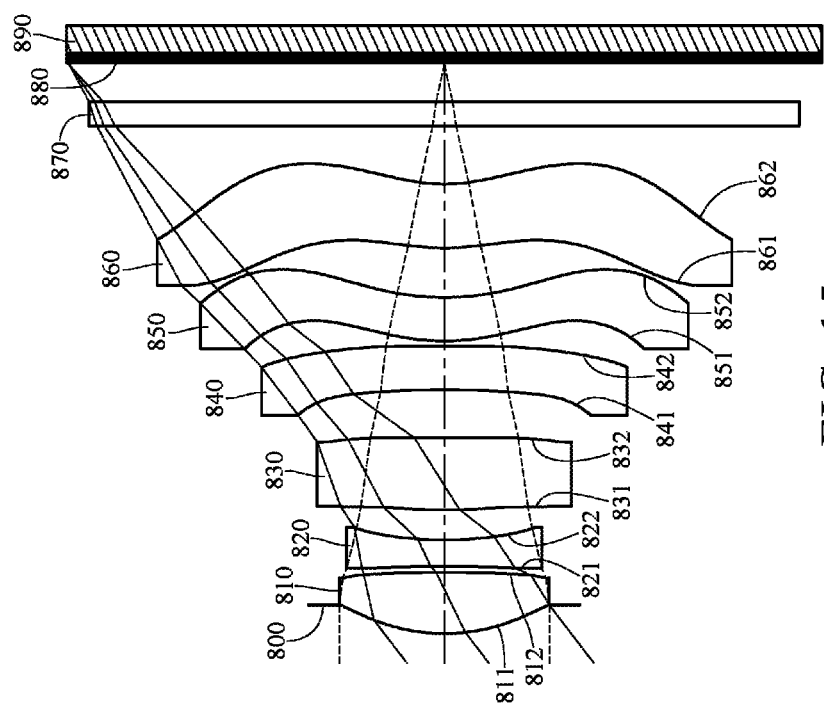
FIG. 15 is a schematic view of an image capturing unit according to the 8th embodiment of the present disclosure.
Figure 16:
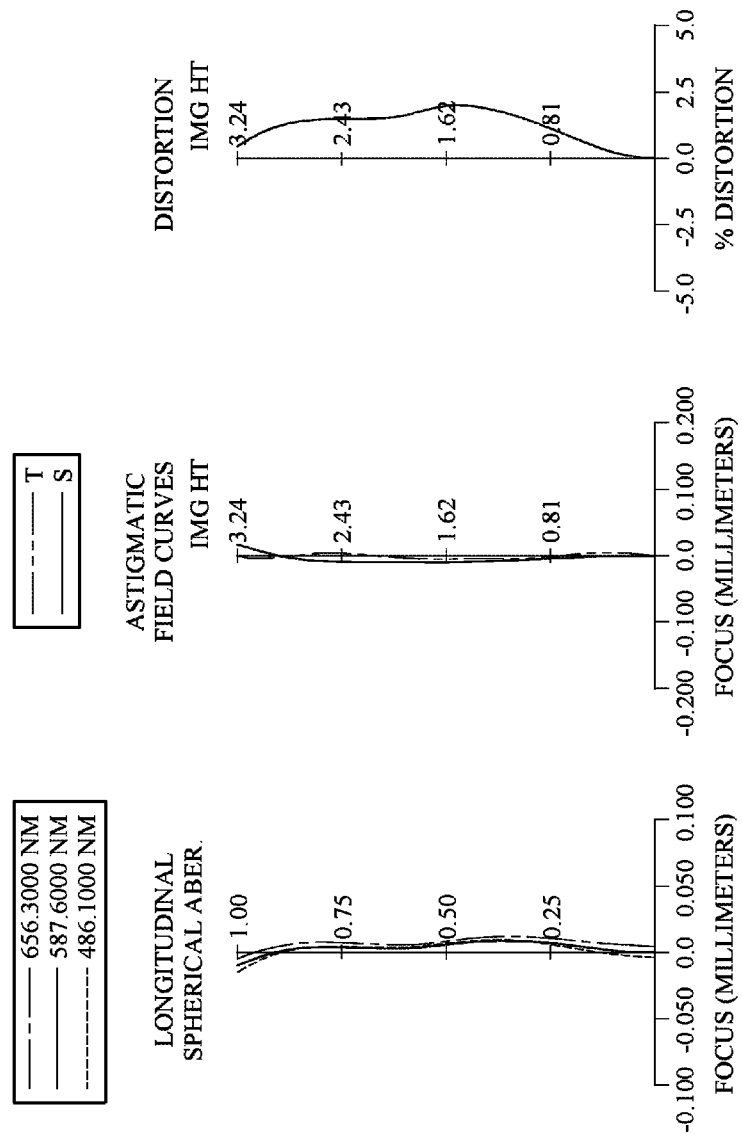
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 890. The photographing optical lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880, wherein the photographing optical lens assembly has a total of six lens elements (810-860). There is an air gap in a paraxial region between every two lens elements (810-860) of the photographing optical lens assembly that are adjacent to each other.

The first lens element 810 with positive refractive power has an object-side surface 811 being convex in a paraxial region thereof and an image-side surface 812 being planar in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has a shape changing from concave to convex and a shape changing from convex to concave in an off-axis region thereof.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one convex shape in an off-axis region thereof.

The IR-cut filter 870 is made of glass material and located between the sixth lens element 860 and the image surface 880, and will not affect the focal length of the photographing optical lens assembly. The image sensor 890 is disposed on or near the image surface 880 of the photographing optical lens assembly.

The detailed optical data of the 8th embodiment are shown in Table 15 and the aspheric surface data are shown in Table 16 below.

TABLE 15

8th Embodiment
f = 4.19 mm, Fno = 2.32, HFOV = 37.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.244 | | | | |
| 2 | Lens 1 | 1.612 (ASP) | 0.524 | Plastic | 1.545 | 56.1 | 2.96 |
| 3 | | ∞ (ASP) | 0.051 | | | | |
| 4 | Lens 2 | 79.804 (ASP) | 0.230 | Plastic | 1.607 | 26.6 | −4.73 |
| 5 | | 2.769 (ASP) | 0.261 | | | | |
| 6 | Lens 3 | 5.164 (ASP) | 0.616 | Plastic | 1.515 | 56.5 | 12.60 |
| 7 | | 24.323 (ASP) | 0.417 | | | | |
| 8 | Lens 4 | −8.530 (ASP) | 0.379 | Plastic | 1.584 | 28.2 | −16.32 |
| 9 | | −81.981 (ASP) | 0.041 | | | | |
| 10 | Lens 5 | 1.932 (ASP) | 0.375 | Plastic | 1.545 | 56.1 | 17.36 |
| 11 | | 2.262 (ASP) | 0.426 | | | | |
| 12 | Lens 6 | 2.065 (ASP) | 0.550 | Plastic | 1.545 | 56.1 | −13.17 |
| 13 | | 1.453 (ASP) | 0.500 | | | | |
| 14 | IR-cut filter | Plano | 0.210 | Glass | 1.517 | 64.2 | — |
| 15 | | Plano | 0.336 | | | | |
| 16 | Image | Plano | — | | | | |

Note:
Reference wavelength is 587.6 nm (d-line).
Effective radius of the object-side surface of the fifth lens element (Surface 10) is 1.720 mm.

TABLE 16

Aspheric Coefficients

| | Surface # | | | | | |
|---|---|---|---|---|---|---|
| | 2 | 3 | 4 | 5 | 6 | 7 |
| k = | −5.4166E−01 | 0.0000E+00 | −9.0000E+01 | −2.0811E+00 | −8.8478E+01 | −6.2566E+01 |
| A4 = | 6.6474E−03 | −2.1163E−01 | −3.2337E−01 | −1.7944E−01 | −3.1311E−02 | −5.1873E−02 |
| A6 = | −6.9476E−03 | 6.7211E−01 | 1.2316E+00 | 6.7263E−01 | −1.0219E−01 | 1.7767E−02 |
| A8 = | 5.9965E−02 | −1.3297E+00 | −2.5383E+00 | −1.2739E+00 | 3.1884E−01 | −5.9466E−02 |
| A10 = | −2.5778E−01 | 1.4753E+00 | 3.2859E+00 | 1.5990E+00 | −6.5090E−01 | 5.1862E−02 |
| A12 = | 3.1811E−01 | −9.8232E−01 | −2.4036E+00 | −1.0040E+00 | 7.0114E−01 | −1.8674E−02 |
| A14 = | −1.8442E−01 | 2.6933E−01 | 7.5112E−01 | 2.4064E−01 | −2.5512E−01 | 2.9666E−03 |
| A16 = | — | — | — | — | — | 6.0481E−03 |

| | Surface # | | | | | |
|---|---|---|---|---|---|---|
| | 8 | 9 | 10 | 11 | 12 | 13 |
| k = | 1.4891E+01 | −6.9119E+00 | −1.0381E+00 | −1.5711E+01 | −1.8053E+00 | −1.2067E+00 |
| A4 = | −1.1734E−02 | −9.8917E−02 | −6.5151E−02 | 1.4681E−01 | −2.8038E−01 | −2.6333E−01 |
| A6 = | 6.9346E−02 | 9.1908E−02 | −3.7426E−02 | −1.7803E−01 | 1.4719E−01 | 1.3841E−01 |
| A8 = | −1.3034E−01 | −4.2539E−02 | 1.8470E−02 | 9.3209E−02 | −5.7495E−02 | −5.7254E−02 |
| A10 = | 1.0097E−01 | 3.1634E−03 | −1.5252E−02 | −3.0519E−02 | 1.5561E−02 | 1.5001E−02 |
| A12 = | −5.6627E−02 | 4.0377E−03 | 1.1440E−02 | 6.3469E−03 | −2.5357E−03 | −2.3160E−03 |
| A14 = | 1.3841E−02 | −1.1861E−03 | −3.7352E−03 | −7.7316E−04 | 2.2210E−04 | 1.9414E−04 |
| A16 = | — | 6.3469E−05 | 4.2425E−04 | 4.1880E−05 | −8.0680E−06 | −6.8156E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.19 | CT3/(T23 + T34) | 0.91 |
| Fno | 2.32 | |Sag41|/CT4 | 0.58 |
| HFOV [deg.] | 37.5 | Σ(f1/|fi|) | 1.44 |
| R6/R7 | −2.85 | (ΣCT/ImgH) + (ΣAT/ImgH) | 1.20 |
| R10/R11 | 1.10 | T23/T34 | 0.63 |
| CT4/CT3 | 0.62 | CT5/CT6 | 0.68 |
| f3/f4 | −0.77 | R10/f | 0.54 |
| R6/f | 5.80 | |R9/f| + |R10/f| | 1.00 |
| |f/f3| + |f/f4| + |f/f5| + |f/f6| | 1.15 | |Sag32|/CT3 | 0.05 |

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
   a first lens element with positive refractive power having an object-side surface being convex in a paraxial region thereof;
   a second lens element;
   a third lens element with positive refractive power having an object-side surface being convex in a paraxial region thereof and an image-side surface being concave in a paraxial region thereof;
   a fourth lens element with negative refractive power having an object-side surface being concave in a paraxial region thereof and an image-side surface being convex in a paraxial region thereof;
   a fifth lens element with a positive refractive power having an image-side surface being concave in a paraxial region thereof; and
   a sixth lens element having an object-side surface being convex in a paraxial region thereof and an image-side surface being concave in a paraxial region thereof, wherein the image-side surface of the sixth lens element has at least one convex shape in an off-axis region thereof, and the object-side surface and the image-side surface of the sixth lens element are both aspheric;
   wherein the photographing optical lens assembly has a total of six lens elements, and there is an air gap in a paraxial region located between every two lens elements of the photographing optical lens assembly that are adjacent to each other; a curvature radius of the image-side surface of the third lens element is R6, a curvature radius of the object-side surface of the fourth lens element is R7, a curvature radius of the image-side surface of the fifth lens element is R10, a curvature radius of the object-side surface of the sixth lens element is R11, and the following conditions are satisfied:

$-7.0 < R6/R7 < 0$; and $0 < R10/R11 < 2.0$.

2. The photographing optical lens assembly of claim 1, wherein the curvature radius of the image-side surface of the fifth lens element is R10, the curvature radius of the object-side surface of the sixth lens element is R11, and the following condition is satisfied:

$0.35 < R10/R11 < 1.85$.

3. The photographing optical lens assembly of claim 2, wherein the curvature radius of the image-side surface of the fifth lens element is R10, the curvature radius of the object-side surface of the sixth lens element is R11, and the following condition is satisfied:

$0.50 < R10/R11 < 1.50$.

4. The photographing optical lens assembly of claim 2, wherein a central thickness of the third lens element is CT3, a central thickness of the fourth lens element is CT4, and the following condition is satisfied:

$CT4/CT3 < 1.15$.

5. The photographing optical lens assembly of claim 2, wherein a focal length of the third lens element is f3, a focal length of the fourth lens element is f4, and the following condition is satisfied:

$-1.0 < f3/f4 < 0$.

6. The photographing optical lens assembly of claim 1, wherein a focal length of the photographing optical lens assembly is f, the curvature radius of the image-side surface of the third lens element is R6, and the following condition is satisfied:

$0 < R6/f < 2.5$.

7. The photographing optical lens assembly of claim 1, wherein a focal length of the photographing optical lens assembly is f, a focal length of the third lens element is f3, a focal length of the fourth lens element is f4, a focal length of the fifth lens element is f5, a focal length of the sixth lens element is f6, and the following condition is satisfied:

$|f/f3|+|f/f4|+|f/f5|+|f/f6|<1.0$.

8. The photographing optical lens assembly of claim 1, wherein a central thickness of the third lens element is CT3, an axial distance between the second lens element and the third lens element is T23, an axial distance between the third lens element and the fourth lens element is T34, and the following condition is satisfied:

$CT3/(T23+T34)<0.75$.

9. The photographing optical lens assembly of claim 1, wherein a central thickness of the fourth lens element is CT4, a distance in parallel with an optical axis from an axial point of the object-side surface of the fourth lens element on the optical axis to a position of a maximum effective radius of the object-side surface of the fourth lens element is Sag41, and the following condition is satisfied:

$|Sag41|/CT4<1.10$.

10. The photographing optical lens assembly of claim 1, wherein the image-side surface of the third lens element has a shape changing from concave to convex and a shape changing from convex to concave in an off-axis region thereof.

11. The photographing optical lens assembly of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, and the following condition is satisfied:

$$\Sigma(f1/|fi|)<1.75, \text{ wherein } i=2,3,4,5,6.$$

12. The photographing optical lens assembly of claim 1, wherein the second lens element has negative refractive power, the second lens element has an object-side surface being convex in a paraxial region thereof and an image-side surface being concave in a paraxial region thereof, and the fifth lens element has positive refractive power.

13. The photographing optical lens assembly of claim 1, wherein the second lens element has negative refractive power, the second lens element has an object-side surface being convex in a paraxial region thereof and an image-side surface being concave in a paraxial region thereof, and the sixth lens element has negative refractive power.

14. The photographing optical lens assembly of claim 1, wherein a sum of axial distances between every two lens elements of the photographing optical lens assembly adjacent to each other is ΣAT, a sum of central thicknesses of the lens elements of the photographing optical lens assembly is ΣCT, a maximum image height of the photographing optical lens assembly is ImgH, and the following condition is satisfied:

$$0.75<(\Sigma CT/ImgH)+(\Sigma AT/ImgH)<1.33.$$

15. The photographing optical lens assembly of claim 1, wherein an axial distance between the second lens element and the third lens element is T23, an axial distance between the third lens element and the fourth lens element is T34, and the following condition is satisfied:

$$T23/T34<1.5.$$

16. The photographing optical lens assembly of claim 1, wherein a central thickness of the fifth lens element is CT5, a central thickness of the sixth lens element is CT6, and the following condition is satisfied:

$$CT5/CT6<0.95.$$

17. The photographing optical lens assembly of claim 1, wherein a focal length of the photographing optical lens assembly is f, the curvature radius of the image-side surface of the fifth lens element is R10, and the following condition is satisfied:

$$0<R10/f<1.0.$$

18. The photographing optical lens assembly of claim 1, wherein a focal length of the photographing optical lens assembly is f, a curvature radius of an object-side surface of the fifth lens element is R9, the curvature radius of the image-side surface of the fifth lens element is R10, and the following condition is satisfied:

$$|R9/f|+|R10/f|<1.85.$$

19. The photographing optical lens assembly of claim 1, wherein a central thickness of the sixth lens element is the largest among all central thicknesses of the lens elements of the photographing optical lens assembly.

20. The photographing optical lens assembly of claim 1, wherein a curvature radius of the object-side surface of the first lens element is R1, a curvature radius of an image-side surface of the first lens element is R2, a curvature radius of the object-side surface of the second lens element is R3, a curvature radius of an image-side surface of the second lens element is R4, a curvature radius of the object-side surface of the third lens element is R5, the curvature radius of the image-side surface of the third lens element is R6, the curvature radius of the object-side surface of the fourth lens element is R7, a curvature radius of the image-side surface of the fourth lens element is R8, a curvature radius of an object-side surface of the fifth lens element is R9, the curvature radius of the image-side surface of the fifth lens element is R10, the curvature radius of the object-side surface of the sixth lens element is R11, a curvature radius of the image-side surface of the sixth lens element is R12, and the following condition is satisfied:

$$|R12|<|Ri|, \text{ wherein } i=1,2,3,4,5,6,7,8,9,10,11.$$

21. The photographing optical lens assembly of claim 1, wherein a central thickness of the third lens element is CT3, a distance in parallel with an optical axis from an axial point of the image-side surface of the third lens element on the optical axis to a position of a maximum effective radius of the image-side surface of the third lens element is Sag32, and the following condition is satisfied:

$$|Sag32|/CT3<0.15.$$

22. An image capturing unit, comprising:
the photographing optical lens assembly of claim 1; and
an image sensor, wherein the image sensor is disposed on an image surface of the photographing optical lens assembly.

23. An electronic device, comprising:
the image capturing unit of claim 22.

24. A photographing optical lens assembly comprising, in order from an object side to an image side:
a first lens element with positive refractive power having an object-side surface being convex in a paraxial region thereof;
a second lens element;
a third lens element with positive refractive power having an object-side surface being convex in a paraxial region thereof and an image-side surface being concave in a paraxial region thereof;
a fourth lens element with negative refractive power having an object-side surface being concave in a paraxial region thereof and an image-side surface being convex in a paraxial region thereof;
a fifth lens element having an image-side surface being concave in a paraxial region thereof; and
a sixth lens element having an object-side surface being convex in a paraxial region thereof and an image-side surface being concave in a paraxial region thereof, wherein the image-side surface of the sixth lens element has at least one convex shape in an off-axis region thereof, and the object-side surface and the image-side surface of the sixth lens element are both aspheric;
wherein the photographing optical lens assembly has a total of six lens elements, and there is an air gap in a paraxial region located between every two lens elements of the photographing optical lens assembly that are adjacent to each other; a curvature radius of the image-side surface of the third lens element is R6, a curvature radius of the object-side surface of the fourth lens element is R7, a curvature radius of the image-side surface of the fifth lens element is R10, a curvature radius of the object-side surface of the sixth lens element is R11, a central thickness of the third lens element is CT3, an axial distance between the second lens element and the third lens element is T23, an axial distance between the third lens element and the fourth lens element is T34, and the following conditions are satisfied:

$-7.0 < R6/R7 < 0;$ $0 < R10/R11 < 2.0;$ and $CT3/(T23+T34) < 0.75.$

25. The photographing optical lens assembly of claim 24, wherein the curvature radius of the image-side surface of the fifth lens element is R10, the curvature radius of the object-side surface of the sixth lens element is R11, and the following condition is satisfied:

$0.35 < R10/R11 < 1.85.$

26. The photographing optical lens assembly of claim 25, wherein the curvature radius of the image-side surface of the fifth lens element is R10, the curvature radius of the object-side surface of the sixth lens element is R11, and the following condition is satisfied:

$0.50 < R10/R11 < 1.50.$

27. The photographing optical lens assembly of claim 25, wherein a focal length of the third lens element is f3, a focal length of the fourth lens element is f4, and the following condition is satisfied:

$-1.0 < f3/f4 < 0.$

28. The photographing optical lens assembly of claim 24, wherein a focal length of the photographing optical lens assembly is f, the curvature radius of the image-side surface of the third lens element is R6, and the following condition is satisfied:

$0 < R6/f < 2.5.$

29. The photographing optical lens assembly of claim 24, wherein a focal length of the photographing optical lens assembly is f, a focal length of the third lens element is f3, a focal length of the fourth lens element is f4, a focal length of the fifth lens element is f5, a focal length of the sixth lens element is f6, and the following condition is satisfied:

$|f/f3|+|f/f4|+|f/f5|+|f/f6| < 1.0.$

30. The photographing optical lens assembly of claim 24, wherein a central thickness of the fourth lens element is CT4, a distance in parallel with an optical axis from an axial point of the object-side surface of the fourth lens element on the optical axis to a position of a maximum effective radius of the object-side surface of the fourth lens element is Sag41, and the following condition is satisfied:

$|Sag41|/CT4 < 1.10.$

31. The photographing optical lens assembly of claim 24, wherein the image-side surface of the third lens element has a shape changing from concave to convex and a shape changing from convex to concave in an off-axis region thereof.

32. The photographing optical lens assembly of claim 24, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, and the following condition is satisfied:

$\Sigma(f1/|fi|) < 1.75,$ wherein $i=2,3,4,5,6.$

33. The photographing optical lens assembly of claim 24, wherein a sum of axial distances between every two lens elements of the photographing optical lens assembly adjacent to each other is ΣAT, a sum of central thicknesses of the lens elements of the photographing optical lens assembly is ΣCT, a maximum image height of the photographing optical lens assembly is ImgH, and the following condition is satisfied:

$0.75 < (\Sigma CT/ImgH)+(\Sigma AT/ImgH) < 1.33.$

34. The photographing optical lens assembly of claim 24, wherein a central thickness of the fifth lens element is CT5, a central thickness of the sixth lens element is CT6, and the following condition is satisfied:

$CT5/CT6 < 0.95.$

35. The photographing optical lens assembly of claim 24, wherein a focal length of the photographing optical lens assembly is f, the curvature radius of the image-side surface of the fifth lens element is R10, and the following condition is satisfied:

$0 < R10/f < 1.0.$

36. The photographing optical lens assembly of claim 24, wherein a focal length of the photographing optical lens assembly is f, a curvature radius of an object-side surface of the fifth lens element is R9, the curvature radius of the image-side surface of the fifth lens element is R10, and the following condition is satisfied:

$|R9/f|+|R10/f| < 1.85.$

37. The photographing optical lens assembly of claim 24, wherein a central thickness of the sixth lens element is the largest among all central thicknesses of the lens elements of the photographing optical lens assembly.

38. The photographing optical lens assembly of claim 24, wherein a curvature radius of the object-side surface of the first lens element is R1, a curvature radius of an image-side surface of the first lens element is R2, a curvature radius of an object-side surface of the second lens element is R3, a curvature radius of an image-side surface of the second lens element is R4, a curvature radius of the object-side surface of the third lens element is R5, the curvature radius of the image-side surface of the third lens element is R6, the curvature radius of the object-side surface of the fourth lens element is R7, a curvature radius of the image-side surface of the fourth lens element is R8, a curvature radius of an object-side surface of the fifth lens element is R9, the curvature radius of the image-side surface of the fifth lens element is R10, the curvature radius of the object-side surface of the sixth lens element is R11, a curvature radius of the image-side surface of the sixth lens element is R12, and the following condition is satisfied:

$|R12| < |Ri|,$ wherein $i=1,2,3,4,5,6,7,8,9,10,11.$

39. A photographing optical lens assembly comprising, in order from an object side to an image side:

a first lens element with positive refractive power having an object-side surface being convex in a paraxial region thereof;

a second lens element;

a third lens element with positive refractive power having an object-side surface being convex in a paraxial region thereof and an image-side surface being concave in a paraxial region thereof;

a fourth lens element with negative refractive power having an object-side surface being concave in a paraxial region thereof and an image-side surface being convex in a paraxial region thereof;

a fifth lens element having an image-side surface being concave in a paraxial region thereof; and a sixth lens element having an object-side surface being convex in a paraxial region thereof and an image-side surface being concave in a paraxial region thereof, wherein the image-side surface of the sixth lens element has at least one convex shape in an off-axis region thereof, and the object-side surface and the image-side surface of the sixth lens element are both aspheric;

wherein the photographing optical lens assembly has a total of six lens elements, and there is an air gap in a paraxial region located between every two lens elements of the photographing optical lens assembly that are adjacent to each other;

wherein a curvature radius of the object-side surface of the first lens element is R1, a curvature radius of an image-side surface of the first lens element is R2, a curvature radius of an object-side surface of the second lens element is R3, a curvature radius of an image-side surface of the second lens element is R4, a curvature radius of the object-side surface of the third lens element is R5, a curvature radius of the image-side surface of the third lens element is R6, a curvature radius of the object-side surface of the fourth lens element is R7, a curvature radius of the image-side surface of the fourth lens element is R8, a curvature radius of an object-side surface of the fifth lens element is R9, a curvature radius of the image-side surface of the fifth lens element is R10, a curvature radius of the object-side surface of the sixth lens element is R11, a curvature radius of the image-side surface of the sixth lens element is R12, and the following conditions are satisfied:

$-7.0 < R6/R7 < 0$;

$0 < R10/R11 < 2.0$; and $|R12| < |Ri|$, wherein $i=1,2,3,4,5,6,7,8,9,10,11$.

40. The photographing optical lens assembly of claim 39, wherein a central thickness of the third lens element is CT3, a central thickness of the fourth lens element is CT4, and the following condition is satisfied:

$CT4/CT3 < 1.15$.

41. The photographing optical lens assembly of claim 39, wherein a focal length of the third lens element is f3, a focal length of the fourth lens element is f4, and the following condition is satisfied:

$-1.0 < f3/f4 < 0$.

42. The photographing optical lens assembly of claim 39, wherein a focal length of the photographing optical lens assembly is f, the curvature radius of the image-side surface of the third lens element is R6, and the following condition is satisfied:

$0 < R6/f < 2.5$.

43. The photographing optical lens assembly of claim 39, wherein a central thickness of the fourth lens element is CT4, a distance in parallel with an optical axis from an axial point of the object-side surface of the fourth lens element on the optical axis to a position of a maximum effective radius of the object-side surface of the fourth lens element is Sag41, and the following condition is satisfied:

$|Sag41|/CT4 < 1.10$.

44. The photographing optical lens assembly of claim 39, wherein the image-side surface of the third lens element has a shape changing from concave to convex and a shape changing from convex to concave in an off-axis region thereof.

45. The photographing optical lens assembly of claim 39, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, and the following condition is satisfied:

$\Sigma(f1/|fi|) < 1.75$, wherein $i=2,3,4,5,6$.

46. The photographing optical lens assembly of claim 39, wherein a sum of axial distances between every two lens elements of the photographing optical lens assembly adjacent to each other is $\Sigma AT$, a sum of central thicknesses of the lens elements of the photographing optical lens assembly is $\Sigma CT$, a maximum image height of the photographing optical lens assembly is ImgH, and the following condition is satisfied:

$0.75 < (\Sigma CT/ImgH) + (\Sigma AT/ImgH) < 1.33$.

47. The photographing optical lens assembly of claim 39, wherein an axial distance between the second lens element and the third lens element is T23, an axial distance between the third lens element and the fourth lens element is T34, and the following condition is satisfied:

$T23/T34 < 1.5$.

48. The photographing optical lens assembly of claim 39, wherein a central thickness of the fifth lens element is CT5, a central thickness of the sixth lens element is CT6, and the following condition is satisfied:

$CT5/CT6 < 0.95$.

49. The photographing optical lens assembly of claim 39, wherein a central thickness of the third lens element is CT3, a distance in parallel with an optical axis from an axial point of the image-side surface of the third lens element on the optical axis to a position of a maximum effective radius of the image-side surface of the third lens element is Sag32, and the following condition is satisfied:

$|Sag32|/CT3 < 0.15$.

* * * * *